United States Patent
Khasis

(10) Patent No.: US 10,354,217 B2
(45) Date of Patent: Jul. 16, 2019

(54) CONSTRAINT-BASED COMPLEX DYNAMIC ROUTE SEQUENCING ROUTE SEQUENCING FOR MULTI-VEHICLE FLEETS

(71) Applicant: Route4Me, Inc., Fort Lee, NJ (US)

(72) Inventor: Dan Khasis, Fort Lee, NJ (US)

(73) Assignee: Route4Me, Inc., Fort Lee, NJ (US)

( * ) Notice: Subject to any disclaimer, the term of this patent is extended or adjusted under 35 U.S.C. 154(b) by 0 days.

(21) Appl. No.: 15/658,496

(22) Filed: Jul. 25, 2017

(65) Prior Publication Data

US 2017/0323249 A1    Nov. 9, 2017

Related U.S. Application Data

(63) Continuation of application No. 15/456,521, filed on Mar. 11, 2017, now Pat. No. 9,792,575.

(Continued)

(51) Int. Cl.

| | |
|---|---|
| *G08G 1/00* | (2006.01) |
| *G01C 21/34* | (2006.01) |
| *G06Q 10/08* | (2012.01) |
| *G05D 1/02* | (2006.01) |
| *G01C 21/36* | (2006.01) |
| *G05D 1/00* | (2006.01) |
| *G08G 1/01* | (2006.01) |
| *G08G 1/0968* | (2006.01) |

(52) U.S. Cl.
CPC ....... *G06Q 10/083* (2013.01); *G01C 21/3415* (2013.01); *G01C 21/3469* (2013.01); *G01C 21/3492* (2013.01); *G01C 21/3697* (2013.01); *G05D 1/0088* (2013.01); *G05D 1/0287* (2013.01); *G08G 1/012* (2013.01); *G08G 1/0112* (2013.01); *G08G 1/0116* (2013.01); *G08G 1/0129* (2013.01); *G08G 1/0133* (2013.01);

(Continued)

(58) Field of Classification Search
CPC ............ G01C 21/3425; G01C 21/3461; G05D 1/0088; G05D 1/0087; G08G 1/00
USPC ................................ 701/410, 412, 533, 117
See application file for complete search history.

(56) References Cited

U.S. PATENT DOCUMENTS

| | | | |
|---|---|---|---|
| 5,958,012 A | 9/1999 | Battat | |
| 6,256,577 B1 * | 7/2001 | Graunke | ............ G01C 21/3694 |
| | | | 701/117 |

(Continued)

OTHER PUBLICATIONS

Augus Loten, MIT Team Uses Big Data, IoT to Speed Up 'Last Mile' Deliveries, CIO Journal, Mar. 23, 2016.

*Primary Examiner* — Tan Q Nguyen
(74) *Attorney, Agent, or Firm* — Ricky Lam

(57) ABSTRACT

Methods and systems to dynamically and optimally sequence routes based on historical and real-time traffic conditions, and to predict anticipated traffic conditions along the dynamically generated route are disclosed. Route sequencing may be based on a set of predefined constraints, e.g., distance, time, time with traffic, or any objective cost function. The system of the present invention may be implemented in a vehicle fleet comprising one or more vehicles with one or more depots, or with no depots. An optimization server obtains real-time, historical and/or predicted future traffic, weather, hazard, and avoidance-zone data on road segments to generate a route, while staying within parameters and constraints set by an automatic machine learning process, an artificial intelligence program, or a human administrator. The platform may be coupled to sensors positioned on roads, e.g., speed radar or camera, and sensors positioned in vehicles, e.g., GPS system or on-board diagnostic sensor.

20 Claims, 14 Drawing Sheets

Related U.S. Application Data

(60) Provisional application No. 62/436,449, filed on Dec. 20, 2016, provisional application No. 62/372,313, filed on Aug. 9, 2016, provisional application No. 62/338,487, filed on May 18, 2016, provisional application No. 62/307,402, filed on Mar. 11, 2016.

(52) U.S. Cl.
CPC ........... *G08G 1/0145* (2013.01); *G08G 1/202* (2013.01); *G08G 1/207* (2013.01); *G01C 21/3461* (2013.01); *G08G 1/096811* (2013.01)

(56) References Cited

U.S. PATENT DOCUMENTS

| | | | |
|---|---|---|---|
| 6,317,686 B1* | 11/2001 | Ran | G01C 21/3691 701/117 |
| 8,275,508 B1 | 9/2012 | Adams | |
| 8,374,781 B2 | 2/2013 | Hartman | |
| 8,825,395 B2* | 9/2014 | Boss | G01C 21/3492 701/468 |
| 8,977,481 B1 | 3/2015 | Downs | |
| 9,140,567 B2 | 9/2015 | Fryer | |
| 2004/0030572 A1 | 2/2004 | Campbell | |
| 2005/0093720 A1* | 5/2005 | Yamane | G01C 21/3492 340/995.13 |
| 2006/0031007 A1 | 2/2006 | Agnew | |
| 2007/0155404 A1 | 7/2007 | Yamane | |
| 2009/0276153 A1 | 11/2009 | Lee | |
| 2010/0205022 A1 | 8/2010 | Brown | |
| 2010/0312466 A1* | 12/2010 | Katzer | G01C 21/3492 701/533 |
| 2010/0332121 A1 | 12/2010 | Okude | |
| 2014/0095309 A1 | 4/2014 | Macneille | |
| 2015/0032366 A1* | 1/2015 | Man | H04W 4/046 701/412 |
| 2016/0117871 A1 | 4/2016 | Mcclellan | |
| 2016/0379168 A1 | 12/2016 | Foerster | |
| 2018/0017401 A1* | 1/2018 | Fletcher | G01C 21/3484 |

* cited by examiner

FIG. 5A
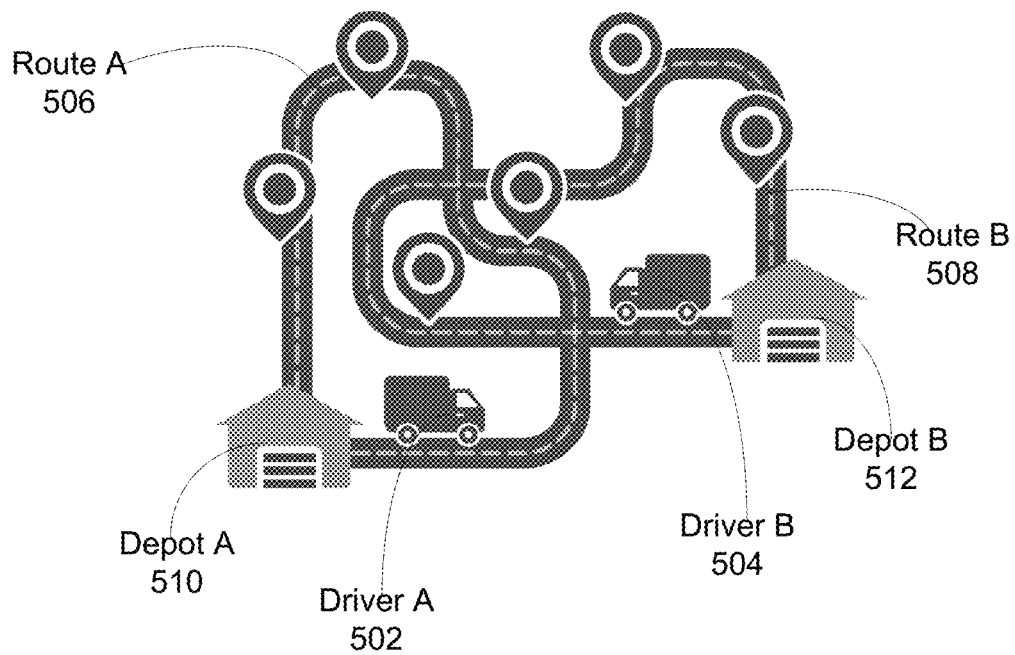
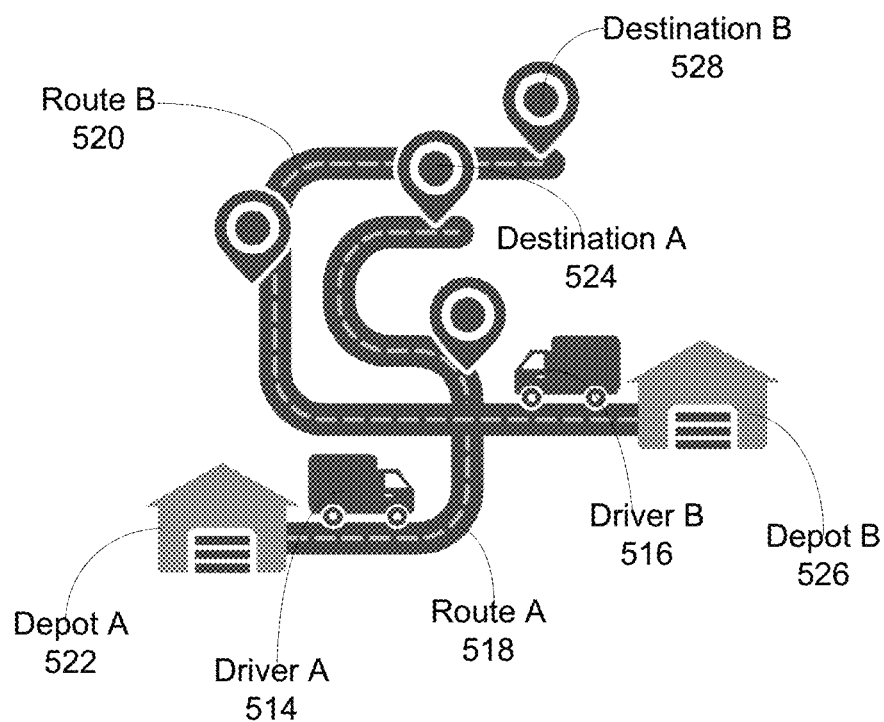
FIG. 5B

CONSTRAINT-BASED COMPLEX DYNAMIC ROUTE SEQUENCING ROUTE SEQUENCING FOR MULTI-VEHICLE FLEETS

CLAIMS OF PRIORITY

This patent application is a continuation and claims priority from U.S. utility patent application Ser. No. 15/456,521, entitled 'Complex dynamic route sequencing for multi-vehicle fleets using traffic and real-world constraints' filed on Mar. 11, 2017, which claims benefit of U.S. provisional patent application No. 62/307,402, entitled 'Complex dynamic route sequencing for multi-vehicle fleets using traffic and real-world constraints', filed Mar. 11, 2016, which claims benefit of U.S. provisional patent application No. 62/338,487, entitled 'Method and system for managing large vehicle fleets through a virtual reality environment', filed May 18, 2016, which claims benefit of U.S. provisional patent application No. 62/372,313, entitled 'Methods and systems for detecting and verifying route deviations', filed Aug. 9, 2016, which claims benefit of U.S. provisional patent application No. 62/436,449, entitled 'Autonomous supply and distribution chain', filed Dec. 20, 2016.

FIELD OF TECHNOLOGY

This disclosure relates generally to techniques for optimally sequencing multi-destination routes using behavioral data and historical, real-time, and predictive traffic data.

BACKGROUND

The use of global positioning system (GPS) navigation systems in vehicles is ubiquitous. GPS devices may be adequate when traversing between two points, such as from point A to point B; however, traveling to more than one location, such as a delivery personnel driving to multiple destinations in a single route, can pose many challenges. GPS devices, GPS navigation software applications on mobile smartphones, or embedded navigation devices typically treat all traffic conditions as equal, and may not compute the fastest and most efficient route when there is more than one destination to visit on a route, such as to avoid a user-defined or dynamically computer-generated hazard area that may be impeding traffic—and usually output or instruct the next location in the exact sequence in which they were inputted.

Between each pair of addresses, sometimes referred to as waypoints on a multi-stop route, there are typically multiple paths that a vehicle may take. While each route may be feasible, not every route will have the same distance and/or duration. Combined with the heading of the vehicle and its direction of travel, the duration of the same route will vary based on traffic conditions and other real-world conditions. Current solutions may only reflect the estimated time of arrival and departure between each sequential pair of locations on a route, but may not dynamically and optimally re-sequence routes based on anticipated traffic conditions and real-world conditions at the time when executing the route will actually take place. Additionally, current solutions may not use Bluetooth low or near-field communication technology for proximity sensing and location identification.

When a large number of vehicles are traveling to the same destination or to a similar general geographical area, traffic jams may occur, and vehicles, drivers, and businesses tend to want to avoid congested roads. Determining the sequence in which multiple vehicles of a fleet should visit specified locations can be complicated due to the chaotic and unpredictable nature of traffic patterns and traffic behaviors. Moreover, traffic patterns are dynamic. Existing techniques may predict the time it will take to get from point A to point B, but may not re-sequence all the stops in a multi-stop route to minimize the amount of time spent in traffic. Additionally, real-time, real-world conditions may not be taken into account, such as when a large number of vehicles are alerted about a problem in one area may cause congestion in another area, even after the problem that originally caused the diversion is long past. The vehicles may be poorly re-routed and may cause traffic congestion in an area where they converge.

Thus, there is a need for a traffic routing, sequencing and optimization system that is capable of optimizing routes with multiple stops while adapting to the dynamic nature of traffic patterns before a vehicle actually travels a route ahead of time, and dynamically updates in real-time.

SUMMARY

Disclosed are a system and a method to dynamically and optimally sequence routes based on historical and real-time traffic conditions, and to predict anticipated traffic conditions along the dynamically generated route.

In one aspect, the present invention discloses a system and a method for optimizing routes implemented by an optimization server communicatively coupled to a processor and memory of a mobile device of a user or vehicle through a network. The optimization server may also be communicatively coupled to an autonomous vehicle's computer system. Route optimization may be defined as a process of calculating the optimum sequence of a route based on a set of predefined constraints, such as, e.g., distance, time, time with traffic, or any objective cost function. The system of the present invention may be implemented in a vehicle fleet comprising one or more vehicles with one or more depots, or with no depots. A depot may be a storage location, a distribution center, an office, a warehouse, or any location on the Earth's surface that may store inventory and may also serve as the starting destination of a route. For round-trip routes, it also serves as the last destination.

The optimization server obtains real-time, historical and/or predicted future traffic, weather, hazard, and avoidance-zone data on road segments to generate a route, while staying within parameters and constraints set by an automatic machine learning process, an artificial intelligence program, or a human administrator of the system. The platform may be communicatively coupled to sensors positioned on roads, e.g., speed radar or camera, and sensors positioned in vehicles, e.g., GPS system or on-board diagnostic sensor. The information received by the optimization server may be obtained, processed, analyzed, and aggregated from one or more multiple third-party sources, e.g., a traffic information vendor, and/or first-party sources, e.g., tracking information obtained from the sensors positioned in the mobile devices, and/or information manually inputted by the administrator. Generated routes may be continually and dynamically updated based on a predetermined time interval, automatically configured triggers, manually configured triggers, and/or as new information becomes available that may necessitate a re-sequencing of one or more routes. Contrary to existing systems, which may not change a generated route and merely estimate the impact that various constraints will have on arrival and departure times, the system of the present invention completely (and continually)

re-sequences the entire route based on a variety of dynamic data for the expected time and at the expected area that the vehicle will traverse through.

In another aspect, the optimization server may comprise two distinct route optimization types, namely, single vehicle routes and multiple vehicle routes. The single vehicle route optimization may include all stopping destinations in a single route, and may determine the best possible sequence for visiting the destinations based on efficiency, such as, e.g., driving time and distance.

The multiple vehicle route optimization type may automatically split a route into multiple parts among two or more designated vehicles. Optimally sequenced routes may be split by any numerical unit, e.g., meters, feet, minutes, hours. The optimization server may also permit an automated machine process or a manually inputted goal to balance the optimization, such that the system changes its behavior to approximately or exactly balance the number of destinations across multiple vehicles, or to dynamically minimize the number of vehicles necessary to visit all the locations on a route, while simultaneously respecting all machine-generated or human specified constraints.

An algorithm may model real-world constraints and limitations that exist in a collection of related or unrelated vehicles that are connected to the system, such as operational constraints, e.g., one or multiple time windows, time per location, travel time with and without traffic, machine-generated or human defined avoidance zones, distance, and route duration; asset management constraints, e.g., vehicle volume capacity, maximum load weight, and road restrictions; business constraints, e.g., number of drivers, driver skill, and customer priority; and natural world constraints, e.g., weather, time of sunrise, time of sunset, and visibility conditions due to fog.

The optimization server may select a collection of routes to recommend to vehicles as the most efficient route to travel between every location on the route, while staying within the parameters and constraints set by an automated computer generated process or by a human administrator. The optimization server may then provide the vehicles with turn-by-turn driving directions to reach the one or more destinations along the route, and may present information and metadata about the route and each location on the route, such as, e.g., the mileage of the route, the estimated time of arrival of one or more destinations, fuel usage, cost to fulfill the route, the likelihood of congestion, the likelihood of an accident, as well as location specific delays. Driving directions may restrict the user to travel on designated roadways or to avoid machine generated or human administrator defined avoidance zones.

Avoidance zones can restrict the travel path of all vehicles, or of a specific type of vehicle or driver in the fleet. Avoidance zones may also act as travel time coefficients, travel time accelerators, or travel time decelerators. For example, an avoidance zone may be created by an administrator or accessed from a first-party or third-party database to specify that a vehicle comprising specific attributes will travel at a different rate of speed than the maximum posted and permitted speed limits. This capability enables administrators and the self-learning system to adjust road segment speeds to match real-world expertise, real-world knowledge, and real-world data that has been collected over any period of time.

In yet another aspect, the present invention discloses a system and a method of dynamic customization and sequencing of multi-driver, multi-depot, no-depot, and multi-destination routes. The system may allow for modifications of routes that may already be in progress, e.g., adding and removing destinations, without violating constraints such as time windows and travel duration. After modification, the existing route may be re-sequenced such that remaining destinations remain optimally sequenced while taking the modifications into account. For example, if a new destination is inserted into an existing route comprising existing multiple destinations, then the new destination will be positioned in the most optimal route position and may be assigned to the most appropriate vehicle based on availability, shortest time and/or closest distance, e.g., a vehicle with an existing route in or near the area of the new destination.

In yet another aspect, the present invention discloses a system and a method for geocoding coordinates of users and destinations on a map. Geocoding may be a process of using the description of a location, e.g., a destination address, to reveal the latitude and longitude coordinates of that location. Users of the system may be tracked through the geocoding of their location. Tracking may be defined as the action of persistent storing or using signals that are transmitted to GPS devices or received by a device from location emitting sensors, e.g., cellular towers, NFC near field communication devices, BLE Bluetooth low energy devices, iBeacon technology, to determine the location, speed and direction of a user and/or vehicle in real time. The system may also allow for reverse geocoding, which may be a process of back (reverse) coding of coordinates to a readable destination description, e.g., the destination address or rooftop coordinates.

The route may be optimized for the shortest distance, shortest time, or shortest time taking into consideration real-time information and historical information of manually inputted data, third-party data, and/or first-party vehicle-tracked traffic data and/or user-tracked behavioral data. In order for the system to differentiate user behavior from vehicle maneuvers, the prediction module may equate a sustained slow speed of travel reported from the position detection device as the user is on foot, such as, e.g., 1-4 MPH. Additionally, the system may detect a transition between walking and driving modes using an accelerometer, and/or external or embedded sensor of the mobile device.

As a vehicle progresses through its route, a data log of traversal transmissions may be provided to the platform. Transmissions may occur in real-time or may be reconciled or synchronized to the system in batches, e.g., such as when a vehicle's or device's Internet connectivity is temporarily lost. A log from multiple vehicles may be merged to create historical records organized by geography, time, and etc. Combining current information with historical information, the prediction module may forecast future traffic patterns and user behavior patterns. Therefore, users may be provided with not only the most efficient, e.g., shortest, driving route given current traffic conditions, but an optimal route sequence that is predicted for the entirety of the trip that accounts for user behavior. Further, the behaviors and corresponding duration of activities that may occur at each stop on the route responsible by external machines, e.g., an automatic loading robot, an automatic unloading robot, an automatic loading dock, a human-being loading or unloading a truck, can also be incorporated into the route optimization model.

BRIEF DESCRIPTION OF THE DRAWINGS

Example embodiments are illustrated by way of example and are not limited to the figures of the accompanying drawings, in which, like references indicate similar elements.

FIGS. 5A-B are schematics of optimized routes comprising multiple drivers and multiple depots, according to at least one embodiment.

DETAILED DESCRIPTION

Disclosed are a system and a method to dynamically and concurrently sequence one or more routes based on current, historical, and predicted traffic conditions. Predicted traffic conditions may be defined as road and/or weather conditions that may be encountered at a time and a location on the route that are expected to be traversed. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

Figure 1:
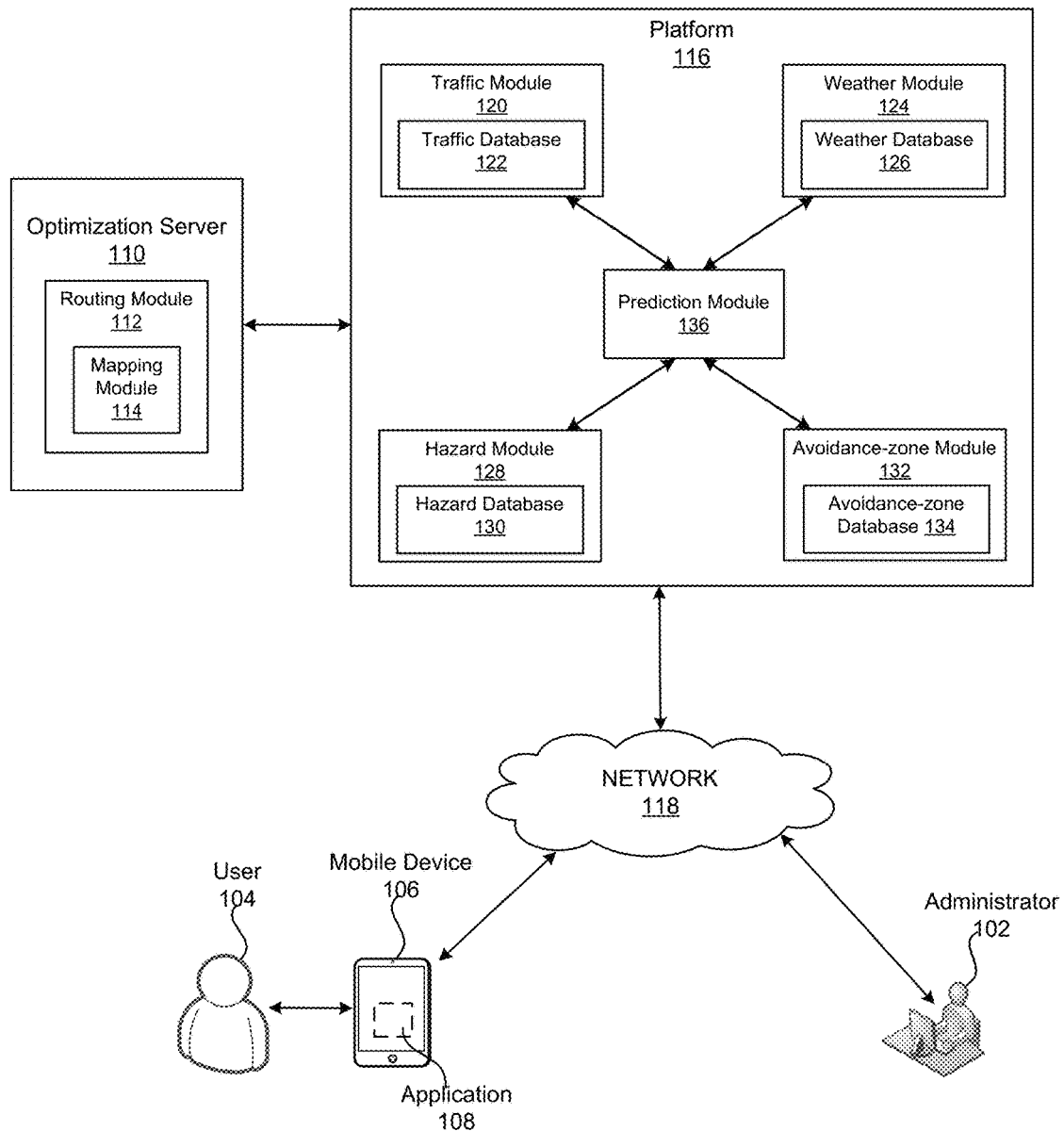
FIG. 1 is a high-level view of a network communication environment, according to at least one embodiment.

FIG. 1 is a high-level view of a network communication environment, according to at least one embodiment. FIG. 1 illustrates an administrator 102; a user 104; a mobile device 106; an application 108; an optimization server 110 comprising a routing module 112 and a mapping module 114; and a platform 116 communicatively coupled to a communication network 118 comprising a traffic module 120 and a traffic database 122, a weather module 124 and a weather database 126, a hazard module 128 and a hazard database 130, and an avoidance-zone module 132, an avoidance-zone database 134, and a prediction module 136.

The user may be a vehicle operator accessing the network through the application 108 of the mobile device 106, or it may be a software application running inside of an autonomous vehicle's computer. The mobile device 106 may be a computing device comprising a central processing unit (CPU), an operating system, wireless network connectivity, a positioning detection device, and etc., such as, e.g., a smartphone, tablet, personal digital assistant (PDA), smart watch and other personal electronic devices. The network 118 may be a pathway that provides wireless communication, e.g., the Internet. The application 108 may access the optimization server 110 through the network 118 to obtain predicted traffic conditions and optimized driving routes. A route may be a way or course planned and taken for getting from a starting point to one or multiple destinations. A road may be a surface created for vehicles to travel on. A segment may be a portion of a road.

The route may be optimized for the shortest distance, shortest time, or shortest time taking into consideration real-time, historical, and predicted future information of manually inputted data, third-party data, and/or first-party vehicle-tracked traffic data and/or user-tracked behavioral data. The optimization server may continually and dynamically update the route at a predetermined time interval, as real-time traffic conditions change, and/or as parameters and constraints are modified by an internal or external computer system. Optimized routes may be assigned to a vehicle by an automated process based on rules, triggers, and/or workflows, or by an administrator. Contrary to existing systems, which may not change a generated route and merely estimate the impact that various constraints will have on arrival and departure times, the system of the present invention completely (and continually) re-sequences the entire route based on a variety of dynamic data for the expected time and at the expected area that the vehicle will traverse through.

The administrator 102 may provide parameters and constraints to the route, such as, e.g., the addresses of multiple destinations and respective arrival times. The application 108 may use the inputs to predict and to recommend to a user of the mobile device 106 a sequence that should be taken to reach the plurality of destinations. The routes generated may comprise driving directions for the vehicle to follow based on the inputs. Driving directions may restrict the vehicle to travel on designated roadways. The application 108 may identify multiple route options from the current location of the one or more vehicles to one or more destinations.

For each route, the optimization server 110 may receive real-time traffic information that is available for segments of the route from: the traffic module 120, the weather module 124, the hazard module 128, and the avoidance-zone module 132. Each of the aforementioned modules may be communicatively coupled to one or more sensors positioned to record respective data on the road segments, such as, e.g., a speed radar to determine traffic speed, and/or sensors positioned in vehicles being operated by the user 104, such as, e.g., a vehicle position detection device. The sensors may provide real-time traffic information to the modules of the platform, or if real-time information is not available, historical traffic information may be provided through a historical database of past sensed data. The historical traffic information retrieved preferably comprises similar current circumstances for the road segment, such as, e.g., weather condition and time of day.

An example of a sensor positioned along roadways that may provide traffic data input to the platform 116 is a loop sensor that may be capable of measuring the number of vehicles passing above the sensor per unit time, vehicle speed and/or other traffic flow data. The sensors may also include cameras, motion sensors, radar ranging devices, RFID devices, and other types of sensors positioned near or embedded within a road. Another example is a digital message sign on or near route segments to inform drivers about upcoming road conditions, such as, e.g., road maintenance and road closure. In addition to the message being displayed, other traffic data that may be transmitted includes: the conditions that caused the message to display, the estimated length of any traffic restrictions in effect, the name of the road that the segment is a part of, and the location of the segment, such as, e.g., state, city, and/or geographical coordinates. In some embodiments, the electronic message information may be provided by the Department of Transportation (DOT) of the respective state in which the road is located. Each state may maintain its own historical database comprising past displayed messages that may be accessible through the network.

An example of a sensor positioned in vehicles that are operated by the user includes a positioning circuitry configured to determine a geographic position of the mobile device 106. The circuitry may include sensing devices that measure the mobile device's travel data, e.g., traveling distance, speed, and direction. Detectors and/or sensors within the positioning circuitry may include an accelerometer and/or a magnetic sensor embedded within the mobile device. The accelerometer may be operable to detect, recognize, and/or measure the rate of change of translational and/or rotational movement. The magnetic sensor, e.g., a compass, may be configured to generate data indicative of a heading. Data from the accelerometer and the magnetic sensor may indicate orientation of the mobile device, and thus the vehicle. Another example is an on-board diagnostic sensor sensing vehicle attributes, such as carbon dioxide emissions. Carbon dioxide emission may be detected by the sensor or it may be computed by the miles-per-gallon (MPG) value of the vehicle assigned to the route, obtained from the vehicle manufacturer. The optimization server may re-sequence the destinations of one or more routes when carbon dioxide emissions data surpasses a predetermined threshold. For example, if the system determines that carbon dioxide emissions level surpasses the acceptable threshold level for a certain route that is caused by extreme increases in elevation, e.g., hills, then the optimization server may re-sequence the destinations of the route to avoid such road segments. Through optimizing routes for carbon dioxide emissions, the system may be able to reduce vehicle stress, lower fuel consumption, and reduce travel time and/or distance.

For each segment of the route for which real-time traffic information is not available, the optimization server may request and receive historical information on the segment from: the traffic database 120, the weather database 124, the hazard database 128, and the avoidance-zone database 132. The historical information requested is preferably under similar current circumstances, such as day, month, time of day, and/or weather condition—if available. Driving directions may be generated based on real-time traffic information, gathered historical traffic information and/or predicted future information, while taking into consideration the route parameters and constraints set by the administrator or an automatic machine learning process. If information about the road speeds or road slowdowns is not available, then speed and travel time predictions may be derived or approximated from a first party and/or a third party database of posted minimum and maximum speed limits along the segments of the road that will be travelled in one or more routes.

The traffic module 120 may store real-time traffic information of segments of roads and transmits to the optimization server upon request. For each segment of a route identified by the routing module 112 for which real-time traffic information is not available, the traffic module 120 requests information of past traffic conditions under similar circumstances from the traffic database 122. Traffic information that is stored in the traffic database 122 may include one or more of the following: average vehicle speed, amount of traffic congestion, an indication of whether the segment is open or closed, and etc. For example, the traffic module 120 may be communicatively coupled to a third-party data source to obtain real-time information that traffic on Broadway Street is slowed down by 5 MPH, or that based on a predicted future information, the current travel speed on Broadway Street is 0.25 times slower or faster than the expected travel speed at a specific point of time in the future.

In some embodiments, the traffic module 120 may update real-time traffic information and store historical traffic information in the traffic database 122 based on information provided by one or more sensors positioned to record traffic data on road segments, such as, e.g., a speed radar to determine traffic speed, and/or a sensor positioned in vehicles being operated by the user 104, such as, e.g., a vehicle position tracking device and an internal or external temperature sensor. For example, measurements of vehicle speed on a segment of a road may allow the traffic module 120 to determine whether the segment is congested.

Additionally, the administrator 102 may manually update traffic information by modifying the traffic database 122, e.g., such as condition and time, for a specific road segment. For example, images captured by cameras on a segment may be used by the administrator to determine whether it is congested, whether an accident or construction zone is present, and the speed of traffic on the segment. Using the information obtained from the images, the administrator 102 can update the traffic module 120 and/or the traffic database 122 manually. The administrator 102 may specify a time to live (TTL), after which the congestion information may self-delete from the database 122 such that it no longer impacts the optimization server 110. The administrator 102 may apply a manual override to a single route, or update a central database so that all routes in the system may access the manually inputted data.

The traffic module 120 transmits real-time traffic information and historical traffic information stored in the traffic database 122 to the prediction module 136 upon request. The prediction module 136 communicates with the optimization server 110 to compute a route sequence based on traffic congestion on the road segments being traveled. For example, the same route may be sequenced differently when considering time-of-day and time-of-year specific traffic patterns.

The hazard module 128 may store real-time information on existing traffic hazards, e.g., vehicle collisions, and special conditions, e.g., road construction zones. For each segment of a route identified by the routing module 112, the hazard module 128 may request information about past road hazards from the hazard database, such as, e.g., the amount and type of road hazards that have occurred in the past under similar conditions. The information may be organized by month, day, time, and weather condition.

For example, the hazard database 130 may store the information that there have been 11 road hazards within the last two years for a certain segment of Sunset Boulevard in Los Angeles on December 12, between 7 AM and 8 AM when the skies are clear with no adverse weather condition. The prediction module 136 may then compare this information with the current scenario to predict real-time traffic conditions. If the current scenario matches, such that it is also December 12, between 7 AM and 8 AM with clear skies and no adverse weather condition, then the prediction module 136 may use this data to predict a likelihood of there being a hazard. On the other hand, if the current scenario does not match, the prediction module 136 may discard this data point and rely on another.

The weather module 124 may store real-time weather information and forecast weather information of different regions and road segments, and may transmit the data to the prediction module 136 upon request. Weather information may include one or more of the following: temperature, wind speed, wind direction, sky condition, fog density, ice accumulation levels, rate and amount of snowfall and rainfall, and etc.

For each segment of a route identified by the routing module 112 where current weather information is unavailable, the prediction module 136 may request from the weather database 126 past weather information for the geography that encompasses the area in a reasonable vicinity of the route. The prediction module 136 may use real-time weather information with past weather information to predict traffic conditions on a road at a precise future geographic location of the driver or vehicle. For each segment, the weather database 126 includes different weather conditions and respective road conditions that have resulted in the past and over a specified time interval. Therefore, as an example, if the current weather condition is wet and raining with 10 MPH wind speed towards the North-West direction, the prediction module 136 may compare that with similar past weather conditions to predict the current road condition for the segment. If traffic tends to slow down by, e.g., 5 MPH during such weather condition, then the prediction module 136 may conclude that the current vehicle speed is also slowed by 5 MPH. The prediction module 136 may communicate with the optimization server 110 to provide the user with an optimized route sequence.

The avoidance-zone module 132 may store avoidance-zone data set by the administrator 102 and/or an automatic machine learning process, and transmits it to the prediction module 136 upon request. An avoidance zone may be an arbitrarily defined area such that vehicles never enter it over the traversal of a designated route. In some embodiments, the avoidance zone may be reversed such that it functions as a "preferred zone" wherein it is an arbitrarily defined area such that vehicles are preferably routed to traverse through. The system may also recognize patterns and generate its own avoidance zone. Through the use of an input device, the administrator 102 may draw a circle or polygon of any shape and any size on a map stored and generated by the mapping module 114 that may include avoidance areas, such as, e.g., construction zones, natural disaster zones, truck restrictions, areas restricted by internal and external business regulations, and generally dangerous areas for vehicle traversal. Designated time intervals may also be set for each avoidance zone. For example, if a known construction site impedes traffic due to its operations between 8 AM and 10 AM on Mondays and Wednesdays for the next three weeks, then the optimized route will avoid the construction site during those designated time windows.

Avoidance zones can restrict the travel path of all vehicles, or it may be vehicle specific, e.g., a specific car that has bad suspensions does not carry too much weight, and/or vehicle type specific, e.g., a tall cargo truck cannot fit under low laying bridges, and/or driver type specific, e.g., unskilled or uncertified driver can't go into a part of a warehouse. Avoidance zones may also act as travel time coefficients, travel time accelerators, or travel time decelerators. For example, an avoidance zone may be created by administrator 102 or accessed from a first-party or third-party database to specify that a vehicle comprising specific attributes will travel at a different rate of speed than the maximum posted and permitted speed limits. This capability enables administrators and the self-learning system to adjust road segment speeds to match real-world expertise, real-world knowledge, and real-world data that has been collected over any period of time.

Avoidance-zones can also be defined, stored, managed, and updated in the avoidance-zone database 134 by a third-party user, administrator, or computer system. For example, if a vehicle was supposed to visit a location on the route and unload at the front of a warehouse, a third-party user administrator at the warehouse facility may specify that the region in front of the warehouse is not accessible because of a temporary road closure, such as, e.g., a construction site, snow accumulation, and etc. As a result, the system may automatically detect and locate the nearest permitted location next to the initially requested location that is outside of the avoidance-zone. In addition, avoidance-zones can be defined and set based on traffic signal schedules and bridge opening and closing schedules. The system and the method may route vehicles to avoid a bridge during times in which it is closed, and/or to avoid a road that is expected to have a red light at the time the vehicle will be present, in order to shorten travel time and reduce operational costs. Alternatively, the route may avoid traffic signals altogether. Data about traffic signal schedules and bridge schedules may be obtained and combined from a first-party tracked database, and/or a crowdsourced databased, and/or third-party databases.

The avoidance-zone module 132 may also store information about prohibited maneuver types for road segments within that avoidance-zone. Prohibited maneuver-type data that may be accessible in the avoidance-zone module includes: left-turn, right-turn, and U-turn. For example, if a particular intersection of a road segment prohibits drivers from making a left turn, the optimization server 110 will sequence an optimum route that avoids such maneuver. The avoidance-zone module 132 may obtain prohibited (and allowed) maneuver data from a third-party source, such as a traffic data vendor, and/or from first-party tracking data. Avoidance-zone attributes and restrictions do not necessarily have to correspond with the restrictions posted on road-segments on the route and can be arbitrarily defined by an administrator because of local area knowledge, or for example, by an automated computer program that detects and suggests the creation of temporary or permanent avoidance-zones to optimize multi-stop routes more effectively.

In addition, prohibited maneuvers may be country-specific, such as due to the reversal of traffic directions. As an example, for countries that drive on the right-hand side of traffic, such as, e.g., the United States and Canada, the optimized route may specify left-turn avoidance zones to avoid collision with traffic in the other direction, while for countries that drive on the left-hand side of traffic, such as, e.g., the United Kingdom and Australia, the optimized route may specify right-turn avoidance zones also to avoid collision with oncoming traffic. U-turns are generally not country specific; however, U-turn avoidance may be implemented in areas that prohibit making a U-turn. When computing the traffic-enabled or non-traffic-enabled time and distance between the destinations that must be visited, the time and distance computation process may incorporate the impact on time and distance that may occur as a result of the maneuver avoidance constraints.

The route sequencing may also take into consideration situations where a one-way road segment alters the direction of traffic, such as, e.g., a country with right-hand side driving direction may comprise a one-way road that requires a driver to make a left turn only at the intersection of the one-way road. In this situation, the optimized route may prohibit the vehicle or a driver of the vehicle from making a right turn. The route sequence may also take into consideration the additional time and distance of a prohibited turn while sequencing the route.

In the event that avoidance-zones, road-segment data, historical or current traffic information have conflicting information, an administrator can specify a bias or priority for a specific data source.

The prediction module 136 communicates with the optimization server 110 to predict current and future traffic conditions, and to sequence a route based on real-time and historical data collected from the traffic module 120, weather module 124, hazard module 128, and avoidance-zone module 132 on the road segments being traveled. For each route identified by the routing module 112, the prediction module 136 predicts: travel time, congestion level, hazard information, weather conditions, avoidance zones, and etc. For example, if a route is requested in an area for the day after a major snow or rain event, the present invention will take into consideration anticipated slowdowns that may still be in effect due to post weather event congestion, such as, e.g., due to ice, snow accumulation, lane closures and flooding. The prediction module 136 may take into account the reduction in traffic speed on the route, depending on the severity of the weather condition. The same route may be sequenced differently when considering time-of-day and time-of-year specific traffic patterns.

In some embodiments, predicting the travel time for a route may comprise the prediction module identifying each segment of the route, calculating the travel time for each segment and summing the calculated travel times of the segments to determine the total travel time for the route. In at least one embodiment, the prediction module calculates travel time using the formula, $T=D/S$, where T is the travel time, D is the travel distance, and S is the average speed at which traffic is currently travelling on the segment. In general, the more segments that the system obtains from a given route, the more accurate the predicted travel time will be. If real-time traffic information is not available for the segment, the prediction module may calculate the travel time for the segment by substituting current speed with a predicted speed. The predicted speed is a prediction of the average speed on the segment. The prediction module 136 may determine the predicted speed using information received by the traffic module 120, weather module 124, the hazard module 128, and/or avoidance zone module 132. For example, a predicted speed can be determined if the information includes a vehicle speed, such as, e.g., a recommended speed or a recorded speed. If a predicted speed is not available, the prediction module may use the minimum and maximum posted speed limits on the roadway segment.

In one embodiment, the prediction module 136 predicts and assigns a congestion level to the route, such as, e.g., a high, a medium, or a low level of congestion. Congestion levels for each segment may be based on real-time and/or historical data obtained from traffic module 120, weather module 124, hazard module 128, and/or avoidance-zone module 132. In some embodiments, traffic speed is used to determine the congestion level. For a route comprising multiple segments with varying congestion levels, the prediction module 136 determines the congestion level along each segment of the route and computes the total travel time to travel all the connected road segments taking into account the impact of the traffic slowdown or traffic speed for each road segment in the route being traveled. The administrator 102 may configure the prediction module 136 to determine the congestion level by selecting the greater or lesser of the congestion factors along each segment of the route, for example, such that a high level of congestion on a particular road segment may indicate that the likelihood of congestion of the entire route is also high, or vice versa.

The prediction module may assign priority levels to the traffic module 120, the weather module 124, the hazard module 128, and/or the avoidance-zone module 132 in such a manner that a higher priority level indicates heavier weight and reliance on the information received than compared to a lower priority level. In one embodiment of the invention, the avoidance zone module 132 may be set at the highest priority, the traffic module 120 may be set at the second highest priority, the weather module 124 may be set at the lowest priority, and the hazard module 128 may be set at the second lowest priority. Additionally, the prediction module 136 may assign a higher priority level to real-time traffic data when compared with historical traffic data. The system may also assign a higher priority level to first-party tracked data than third-party source data, or the inverse. The priority levels set by the prediction module 136 may vary, depending on availability of information and current circumstances. The administrator 102 may also set or override predetermined priority levels for each route. A priority level override permits the administrator 102 or an automatic computer program to set ad-hoc priority levels without impacting all other routes in the system. However, if none of the traffic module 120, the weather module 124, the hazard module 128, and/or the avoidance-zone module 132 receive data that can be used to determine the predicted speed of the segment, then the prediction module 136 may determine that the predicted speed is the normal speed limit of the segment. The prediction module may receive the normal travel time from the mapping module 114.

An administrator or computer program accessing the optimization server 110 and prediction module 136 can configure or specify the method with which to compute the departure time. For example, in an instance when a route has time windows, a vehicle or user may not need to arrive to the next location on the route for some amount of time. The prediction module 136 can change the behavior of the traffic prediction and time estimation by instructing the vehicle or driver to wait at its current location, and then depart to the next location at a specific time to minimize and avoid traffic congestion along the route. Alternatively, the prediction module 136 can instruct the vehicle or driver to depart immediately and wait at the next location.

Historical traffic data may be used in substitution for situations when real-time traffic data is not available. This allows the system to be dynamic and to account for the dynamic nature of traffic patterns, while providing the most efficient route given current traffic conditions. As an example, to predict current traffic conditions on a road segment missing real-time traffic data, historic traffic data may be extrapolated for the same day and time in the preceding week. For illustration, if there is an adverse weather condition that is impacting traffic today or during the current week, but is not present in the previous week, the historical data from last week may not be applicable. Thus, an algorithm may find a better match in another day of the week. Historical and real-time information may be obtained from a third-party source, such as, e.g., a traffic information vendor, and/or from a first-party tracking data.

If historical traffic data is also unavailable, the system may combine and extract data from third-party data sources. Traffic data received from third-party data sources can be retrieved in real-time. A database of stored or cached third-party data may be accessed to compensate for missing data. Traffic data can be retrieved from third-parties concurrently, sequentially, serially, or a combination of all three, and the system or the administrator 102 can determine which traffic data source has greater priority or greater relevance in the geographic area where the route is taking place. Over time, the system may become self-learning, and may incorporate user, vehicle, sensor, and/or driver generated feedback to automatically determine a bias towards a particular third-party data vendor whose traffic data is more accurate for a specific geographic region, and/or a vehicle type and/or a specific driver.

The prediction module 136 may use information received from sensors and devices communicatively coupled to the platform to predict traffic conditions of a route, and to communicate with the optimization server for sequencing of the route. For example, assume that for a particular road segment, the traffic module does not have real-time traffic information; however, there is an electronic sign on the road stating, "Slippery When Wet—Reduce Speed to 20 MPH". Instead of assuming that traffic is flowing at a normal pace, e.g., 50 MPH, the prediction module 136 can use the information from the digital message to predict the speed at which vehicles are traveling on the road to estimate the travel time for the road, or to avoid the road completely. Based on the alert message of the present example, the prediction module would predict that vehicles are traveling at approximately 20 MPH.

Based on predicted traffic conditions of each route, the routing module 112 evaluates and selects multiple routes between each pair of destinations on the list of destinations that have been inputted, and then selects a route that most closely matches the optimization goals of an administrator and/or third-party system—manual and/or automated—making the optimization request. The system may then provide the user with turn-by-turn driving directions to reach the one or more destinations along the route.

In order to properly determine the optimal route sequence, the optimization server 110 may utilize a multi-dimensional data structure that contains cost information between at least each pair of destinations on the list of inputted destinations. The cost computation must be calculated at the time resolution that is required for a specific optimization problem, while concurrently taking into consideration historical weather, predictive weather, fixed avoidance zones, avoidance maneuvers, dynamic avoidance zones, current traffic, historical traffic, destination availability constraints, and/or other real-world constraints, such as the slowdown or speedup with which a specific type of vehicle or specific driver may travel.

The dynamic computation of variable travel times and variable costs between each pair of inputted destinations is important because the travel time between each pair changes based on the time of day, traffic flow, vehicle or driver heading, and other real-world conditions previously listed. As a simplified example, if there are three destinations—A, B, and C—the dynamically variable travel time and variable costs associated with each pair of destinations will change based on the departure and arrival time at each location. It may take 30 minutes to travel from A to B departing at 9 AM, but it may take 10 minutes to travel from A to B departing at 11:30 AM. It may take 30 minutes to travel from B to C departing at 12 PM, but it may take 15 minutes to travel from B to C departing at 12:15 PM. If the system is asked to optimally sequence route using traffic, and other real-world constraints at a 15 minute resolution, then the optimization and routing module 112 will inspect, and/or simulate, and/or evaluate every feasible combination departing in 15 minute increments, and for every inputted destination point. Then, the data extracted from the routing module 112 can be submitted to the optimization server 110, which may analyze and evaluate the detailed travel times or cost data, and it will return one or more suggested optimally sequenced routes that minimize or maximize the overall travel time. As a practical example, the optimization engine may route a vehicle or driver to avoid a heavily congested bridge in the morning to avoid rush hour traffic heading south, recommend that the vehicle or driver visit a customer that is farther away but in a region that has no traffic or other real-world anticipated slowdowns, and then route the vehicle or driver back to another destination on the route when the traffic congestion and/or traffic coefficient and/or other real-world constraints meet the optimization objectives required by the third-party system or user making the optimization request.

The routing module 112 and the platform 116 may work bi-directionally to identify routes to one or more destinations and may continually re-sequence the routes for one or more vehicles at a predetermined time interval or based on new real-time factors in order to meet the optimization sequence goals for which the optimization server 110 is being asked to optimize, such as, e.g., changing weather conditions, and/or traffic conditions, and/or a new avoidance zone inputted by a first-party user, and/or first-party database, and/or a third-party user, and/or a third-party database or sensor. When a request is received by the optimization server 110 for a route to one or more destinations, the routing module 112 may receive from the position detection device of the mobile device 106 the current geographic locations of all first-party vehicles, devices, and/or users as well as concurrently retrieve or receive information about vehicles, devices, or users from third-party data sources. Based on the current locations and inputted destinations, the routing module 112 may retrieve a raster map, or vector map, or an underlying road-network graph from the mapping module 114. The map may be a layer comprising data points, lines, and polygons that represent geographic sites and structures, roads, boundaries, and etc. oriented in geographic space.

The mapping module 114 may convert coordinates received from the position detection device into graphical depictions on the map. The mapping module 114 can accept and dynamically convert coordinates from one coordinate system to another. The mapping module 114 can also represent a closed road-network, for example, roads within a large warehouse or yard. For example, coordinates may be overlaid with a map to show the positions of vehicles and destination points. The mapping module 114 may communicate with the platform to obtain information and coordinates of real-time, historical and predicted future traffic and weather conditions, existing and new hazards, existing and predicted avoidance zones, custom territory input information, and display the information in a similar manner. The mapping module 114 may be country-specific in the sense that it may utilize a map that is specific to that geography, or it may show multiple countries and regions in a single view or data response.

The routing module 112 may also communicate with the prediction module 136 to analyze all available real-time, historical and/or predicted future traffic information on applicable roadway segments gathered from the traffic module 120, the weather module 124, the hazard module 128, and the avoidance zone module 132, including data from sensors coupled to the modules, first-party tracking, and/or third-party sources to determine a preferred route. The administrator 102 may set certain criteria for the requested route, such as, e.g., recommend the route with the shortest predicted travel time, avoid areas with a high likelihood of congestion, and/or avoid areas with a high likelihood of an accident.

The optimization server 110 may select a collection of routes to recommend to vehicles as the most efficient route to travel between every destination on the route, while staying within the parameters and constraints set by an automated computer generated process or by a human administrator. The optimization server 110 may then provide the vehicles with turn-by-turn driving directions to reach the one or more destinations along the route, and may present information and metadata about the route and each location on the route, such as, e.g., the mileage of the route, the estimated time of arrival, fuel usage, cost to fulfill the route, the likelihood of congestion, the likelihood of an accident, as well as location specific delays. Driving directions may restrict the user to travel on designated roadways or to avoid machine generated and/or human administrator defined avoidance zones.

Figure 2:
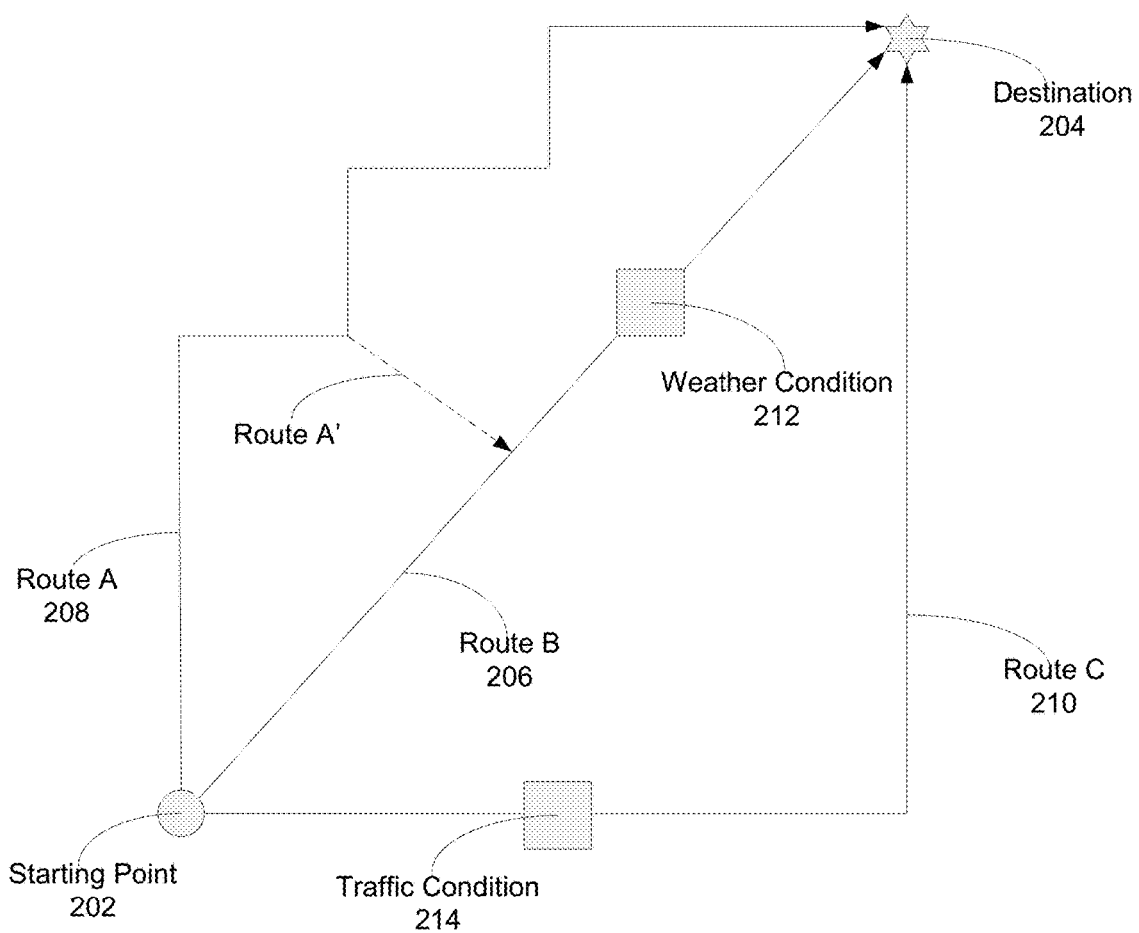
FIG. 2 is a schematic representation of a single destination route, according to at least one embodiment.

FIG. 2 is a schematic representation of a single destination route, according to at least one embodiment. In this example, the distance of travel from starting point 202 to destination 204 is shortest on route B 206, and is longest on route A 208. Even though route A 208 has a longer distance than both route B 206 and route C 210, it may be the system's preferred route due to there being a weather condition 212, such as, e.g., a snowstorm, on route B 206 and a traffic condition 214, such as, e.g., an automotive accident, on route C 210 that may impede traffic flow. However, if the traffic condition 214 and/or the weather condition 212 clears out prior to the driver reaching the destination, then the optimization server may receive updates in real-time and re-route the driver back onto the route with the shortest distance, if roadway permits, such as depicted on route A' 216. Destination 204 may be an address's curbside location or a rooftop location. For example, an address may be associated with a large area and may have separate locations for its curbside and its rooftop, e.g., a ranch or a golf-course.

In at least one embodiment, the present invention discloses a system and a method for optimizing driving routes implemented by an optimization server communicatively coupled to a platform that is communicatively coupled to a processor and memory of a mobile device of a user through a network. The optimization server may also be communicatively coupled to a computer system comprising a processor and a memory of an autonomous vehicle. An autonomous vehicle may be any robotic vehicle, such as, e.g., a self-driving vehicle. Route optimization may be defined as a process of calculating the optimum destination sequence on a route, based on a set of predefined constraints, such as, e.g., distance, time, time with traffic, or any objective cost function. The system of the present invention may be implemented in a vehicle fleet comprising one or more vehicles with one or more depots, or there may be no depots present. A depot may be a storage location that serves as the starting destination of a route. A depot may be a storage location, a distribution center, an office, a warehouse, or any location on the Earth's surface that may store inventory and may also serve as the starting destination of a route. For round-trip routes, it also serves as the last destination.

The optimization server obtains real-time, historical, and predicted future traffic, weather, hazard, and avoidance-zone data on road segments for which to generate a route, while staying within parameters and constraints set by an administrator of the system. The platform may be communicatively coupled to sensors positioned on roads, such as, e.g., a speed radar or a camera, and sensors positioned in user vehicles, such as, e.g., a GPS system or an on-board diagnostic sensor. The information received by the optimization server may be obtained, processed, analyzed, and aggregated from one or more third-party sources, such as, e.g., a traffic information vendor, and/or a first-party source, such as, e.g., tracking information obtained from the sensors positioned in user vehicles and/or information manually inputted by the administrator. Generated routes may be continually and dynamic updated based on a predetermined time interval, automatically configured triggers, manually configured triggers, and/or as new information becomes available that may necessitate a re-sequencing of one or more routes.

The sequenced route may take into consideration, among other constraints, to avoid or to minimize tolls and highways. The system may sequence the route to only use road segments comprising tolls and highways if doing so will bring a significant efficiency to the driving route. In other words, an algorithm of the system computes whether it is more cost effective and/or efficient, e.g., shorter distance of travel, when considering whether to avoid tolls and/or highways, while taking into consideration road-limitations for the specific vehicle types that are part of the vehicle fleet or the optimization problem being solved. In fleets that have autonomous vehicles, the mapping module and optimization module may sequence and select one or more routes to travel comprising roads that are compatible with autonomous vehicles.

A dynamic directed fueling algorithm may determine the most appropriate type of fueling station for each distinct vehicle type in the vehicle fleet along a route for a vehicle to refuel by analyzing the fuel prices of all gas stations on the routes, and then inserting the fueling station as a stop into the planned route, taking fueling time, detour time, detour distance, and detour cost into account. For example, a fueling station may have an eligible fuel type for a specific vehicle in the fleet 10 miles away at a price significantly lower than a fueling station one mile away; however, the time to travel to the farther fueling station at the then-anticipated time of day when it would be most appropriate for the vehicle to refuel or top-off their fuel tank or electric charging battery, taking into consideration all previously mentioned constraints, may be several hours. In this scenario, the routing optimization engine may select a more expensive fueling station that has the lowest overall detour cost. The optimization module may also take into consideration the current fuel or energy capacity of the vehicle, such that the vehicle is not routed to a fueling station that is beyond its reach.

In certain situations, administrators may create and manage a first-party database of preferred fueling stations and only these fueling stations would be considered as eligible for route directed fueling detours. Administrators may also link the route optimization module to receive or retrieve data from preferred third-party fuel databases, such as databases with which they have a preferential fuel card or fueling relationship so that vehicles could only be routed to a permitted set of fueling stations.

In other situations, the system may learn over time from its own first-party database about the time it takes to fuel a vehicle at a specific fueling station. In conjunction with a mobile sensor that can retrieve the overall and current fuel level in all the fuel tanks or batteries in a vehicle, the optimization module may compute the estimated fueling or recharging time by combining the exact amount of fuel that needs to be added into the vehicle, or by estimating the approximate amount of fuel that needs to be added into the vehicle based on the time and distance a vehicle of a certain type has already traveled, using the vehicle's specific fuel or energy utilization per unit of time or distance as a method of approximation. In these instances, the system may recommend that a vehicle is routed to a fueling station that is more expensive, but may take less time to fuel based on historical fueling times such that the time window and other constraints of subsequent destinations on the route can still be satisfied and would not be violated.

In some embodiments, the system and the method may direct a vehicle to refuel at the most optimal refueling or recharging station at any point along the route, while taking into consideration current fuel level, energy level current vehicle weight, and distance, such as, e.g., the next destination's closest refueling station. If the current fuel level does not permit the vehicle to reach the next customer's closest refueling station, then the system and the method may direct the vehicle to the current destination's closest refueling station. By routing the vehicle to the next destination's closest refueling station, this allows the vehicle to travel with less gas, thereby saving weight and thus, fuel cost. For reference, a gallon of fuel weighs approximately 6.183 pounds. Considering some vehicles can have hundreds or thousands of gallons per tank, the fuel cost of the route may be significantly lowered. In some embodiments, the system may optimize the vehicle to refuel based on traffic data, weather data, hazard data, and/or avoidance-zone data for the most cost-efficient route possible.

A dynamic directed layover algorithm may determine the most appropriate type of layover location for each distinct vehicle type, e.g. car, van, truck, in the vehicle fleet along a route for a driver to stop to rest by analyzing the prices of all motels, hotels, rest areas, and etc. on the routes, and then inserting the layover location as a stop into the planned route, taking fueling time, detour time, detour distance, and detour cost into account. For example, a layover location may have an eligible room type, e.g., less than $99 per night, for a specific vehicle in the fleet 10 miles away at a price significantly lower than a layover location one mile away; however, the time to travel to the farther layover location at the then-anticipated time of day when it would be most appropriate for the driver to rest, taking into consideration all previously mentioned constraints, may be several hours. In this scenario, the optimization module may select a more expensive layover location that is greater than $99 per night, but that has the lowest overall detour cost. The optimization module may also take into consideration the current fuel or energy capacity of the vehicle, such that the vehicle is not routed to a layover location that is beyond its reach.

In certain situations, an administrator may create and manage a first-party database of preferred layover locations and only these layover locations would be considered as eligible for route directed layover detours. Administrators may also link the route optimization module to receive or retrieve data from preferred third-party hotel, motel, or rest-area usage databases, such as databases with which they have a preferential relationship so that vehicles could only be routed to a permitted set of layover locations.

An algorithm may determine optimal intersection points of vehicles for mothership routes or replenishment routes, wherein certain types of vehicles may carry packages, parts, and/or assistance to other vehicles in the fleet or in the field. Unlike the list of inputted destinations which has fixed geo-coordinates, the algorithm may use dynamic vehicle positioning to route a vehicle to another vehicle in the fleet. The dynamic vehicle positioning algorithm may use another vehicle's or user's real-time location, last known location, and/or anticipated location at a given point in time. In this scenario, a vehicle of a certain type may need to visit or intersect for a specific interval of time with one, several, or all the other vehicles in a first-party or third-party fleet. For example, if a fleet has 100 vehicles with inventory of certain types, there is a possibility that an important piece of inventory will be missing or defective on one of the vehicles. As the number of vehicles of a fleet grows the chances of missing or defective inventory increases. However, rather than the vehicle with the missing part traveling back to the depot, a replenishment vehicle can be dynamically routed by the optimization module to the current or expected location of the vehicle that needs inventory or resource replenishment. The optimization module may instruct the replenishment vehicles to visit other vehicles in the fleet by determining the optimal points of intersection by considering all the locations of the replenishment vehicles, the locations of all the vehicles in the fleet, and then compute the optimal point of intersection on all the routes. At any time, an administrator may override a suggested optimal point of intersection by inserting a point of intersection or specifying an insertion rule, for example, inserting the point after the most recently visited destination on a route, or at the end of the route.

Replenishment routes and mothership routes do not necessarily have to replenish inventory, but can also be used to bring fuel or a recharge power source to any vehicle on the fleet that may need it. For example, in a fleet of autonomous vehicles, an unexpected major traffic accident or weather delays may cause the autonomous vehicle to fully deplete its energy source. In this case, a replenishment vehicle may be automatically dispatched by the optimization module to the last known dynamic position of the vehicle that needs refueling or recharging to perform an automatic and/or human assisted recharge or refuel. In another instance, a fleet of human operated or autonomously operated snow salt distribution vehicles will distribute salt or salt solution at a rate specific to that vehicle type. After a certain amount of time, the salt or salt solution will have become depleted, and will need to be replenished. The route optimization module in conjunction with the mapping module, and using the dynamic position of the vehicle, can instruct the driver of a replenishment vehicle or an autonomous vehicle system's computer to get additional salt at a destination or facility that has salt available in its inventory to the vehicle that requires the additional supply, while simultaneously not violating any route constraints, optionally in combination with the dynamic directed fueling algorithm, e.g., road type constraints, maximum salt size or type, time window constraints, point-of-no return refueling constraints, and etc.

In some embodiments, the optimization server may comprise two distinct route optimization types, namely, single vehicle routes and multiple vehicle routes. The single vehicle route optimization may include all stopping destinations into a single route, and may determine the best possible sequence for visiting the destinations based on efficiency, such as, e.g., driving time and distance.

The multiple vehicle route optimization type may split a plurality of destinations into several routes and assign to a plurality of vehicles. Optimally sequenced routes may be split by any numerical unit, e.g., meters, feet, minutes, hours. The optimization server may also permit an automated machine process or a manually inputted goal to balance the optimization, such that the system changes its behavior to approximately or exactly balance the number of destinations across multiple vehicles, or to dynamically minimize the number of vehicles necessary to visit all the locations on a route, while simultaneously respecting all machine-generated or human specified constraints. In fleets of autonomous vehicles, each vehicle may comprise a separate communication system, such as, e.g., a GPS system coupled with a magnetic sensor, to communicate with other vehicles in the fleet, such as, e.g., vehicles in its immediate vicinity, to make decisions about the optimized route, such as, e.g., in order to avoid congestion.

An algorithm may model real-world constraints and limitations that exist in a collection of related or unrelated vehicles that are connected to the system, such as operational constraints, e.g., one or more time windows, service time, time per location, travel time with and without traffic, machine-generated or human defined avoidance zones, distance, and route duration; asset management constraints, e.g., vehicle volume capacity, maximum load weight, and road restrictions; business constraints, e.g., number of drivers, driver skill, and customer priority; and natural world constraints, e.g., weather, time of sunrise, time of sunset, and visibility conditions due to fog.

The optimization server may determine the appropriate depot from multiple depots to assign to the appropriate user of multiple users based on efficiency, if any depot is present at all. The multiple driver optimization type may also automatically split a route into equal parts among two or more designated vehicles. The route may be split by the number of stops, travel distance, or travel time. Each route type and each type of vehicle in the fleet may be optimized to end the route at: the departure destination, e.g., the route is a round-trip starting and ending at the same address; the last destination, e.g., the route ends at the last address; or at an unspecified destination, e.g., the starting and ending addresses may be different or the same for each vehicle in the fleet or collection of vehicles, determined by the optimization server based on efficiency, such as, e.g., cost, travel time, or travel distance. The system may allow for the automatic reversal of destination order in a round-trip route, such that the last delivery destination becomes the first delivery destination.

The five types of parameters and constraints that may be inputted by the administrator for the optimization server to stay within while sequencing an optimal route are: operational constraints, inventory constraints, asset management constraints, business constraints, and natural-world constraints. Different priority levels may be set for each of the constraint types and sub-types, e.g., categories within each constraint group, for the optimization server to consider. Each constraint group can have any number of user-defined custom sub-group constraints associated with each vehicle, vehicle type, destination on the route, and driver in the fleet. Generally, a higher priority level is weighed more heavily and takes precedence over a lower priority level.

Operational constraints may be defined as fundamental parameters of every route, such as, e.g., service time, anticipated footsteps per inputted destination, one or more time windows per destination, travel time to and from each destination with and without traffic constraints, distance restrictions, route duration, and various route density parameters. An algorithm may determine the appropriate number of vehicles required for visiting the set of addresses under each constraint to produce the minimal amount of routes required. On the other hand, the administrator may input a minimum number and a maximum number of vehicles, corresponding to the least or biggest number of routes to be created. For example, the administrator may set the minimum number of vehicles to eight and the maximum number of vehicles to 12, each route having a maximum duration of nine hours. If the time windows and capacity constraints require less than eight vehicles (the minimum number of vehicles) visiting the set of addresses for nine hours each (the route duration), then the algorithm may split the addresses into eight equal, or almost equal, subparts. That may mean that the route durations may be shorter than nine hours. However, if the constraints require more than 12 vehicles (the maximum number of vehicles) working nine-hour shifts (the route duration), then the system may create a set of "un-routed destinations" that may appear as a separate route, or a collection of destinations that cannot be visited given the constraints provided to the optimization engine.

In addition, the system may allow the administrator to set vehicle and/or vehicle operator work-hour constraints, either arbitrarily, e.g. based on operational needs, or as defined by a governing body. Work-hour constraints may be defined as constraints or regulations that focus on when and how long a driver may drive by placing specific limits on the amount of time of consecutive driving and the total amount of time driving prior to the driver being no longer permitted to operate a commercial vehicle, such as defined by the "hours-of-service limits" set by the Federal Motor Carrier Safety Administration. For example, a commercial driver type may only be allowed to drive a commercial vehicle up to 12 hours per day, and may not exceed 22 hours in a 48-hour period. Even though the driver's routes are capped at 12 hours per day, the optimization server may take into consideration the broader scope to stay within regulatory limits, and may assign the driver a lesser amount of driving time than their daily driving limits in order to fulfill the broader limit, e.g., 22 hours in a 48-hour period. In the current example, the optimization server may find that within the first 24-hour period, due to various parameters and constraints set, it is most optimal to assign the driver exactly 12 hours of driving. That means the next day it may only assign the same driver a maximum of 10 hours to stay within limits. Or, the system may determine that it is most optimal for the routes to be sequenced such that the first day the driver is assigned 11 hours, and the second day assign another 11 hours or less. The system may be inputted with information collected from the driver's vehicle or smartphone, or captured from an electronic data logging device (ELD) communicatively coupled to the platform, and may assign more work to drivers who may have more hours remaining in a time period, and less work to drivers who may have fewer hours remaining.

Asset management constraints may be parameters and restrictions applied to the asset of a fleet, namely the fleet's vehicles. Examples of this type of constraint are, e.g., weight, height, capacity, axle count, refrigeration capabilities, presence of a forklift, specific skills required to operate the vehicle, fuel tank capacity, electric battery capacity, fuel tank type, electric battery compatibility type, and etc. The optimization server may determine the specific depot for a specific vehicle of a multi-depot and/or multi-driver fleet to visit, e.g., delivery loading and unloading, in sequence. The reverse may also be possible, and the optimization server may determine which vehicle should be assigned to each route, as well as associating each vehicle with each depot ahead of time due to asset management constraints. The distribution of vehicles among the routes, and the sequencing of the routes may follow within the constraints such that they are balanced among all vehicles, or that there is a greater concentration of work density for a majority of the vehicles on the routes, with a certain number of routes generated having fewer destinations Generally, when optimizing for asset management constraints, the optimization server may consider multiple restrictions simultaneously, such that vehicles only travel on pre-approved roads for that vehicle type, and that each vehicle's capacities are not exceeded. Capacities can be defined for a specific vehicle or for all vehicles of a certain type in a fleet. An administrator may set any number of capacities for a vehicle, e.g., maximum weight, maximum cubic volume, maximum floor space piece count, maximum internal height, maximum internal width, maximum weight per square unit of space, as well as restrictions on hazardous materials, roof opening restrictions, and etc. First, there may be road networks that the vehicles are allowed or prohibited to travel on. This means that the vehicle's unique height, weight, axle count, the presence of hazardous materials, and other restrictions may force it to travel on pre-approved roads in order to prevent a dangerous accident, or to comply with transportation laws. The system may maintain a database to store information about approved roads from a third-party source, such as a traffic data vendor, or from a first-party tracked source, such as from a position detection device of the mobile device.

Second, a vehicle for which a route is planned may have certain limitations that may be unique to that specific vehicle. As an example, a box truck can only transport 10 pallets, and the aggregate weight of these pallets must not exceed 10 tons. Therefore, when a route is optimized for a fleet of box trucks, the system will not produce a route that would exceed the maximum pallet count and/or the maximum weight for the box truck. The optimization server may communicate with the avoidance-zone module and the avoidance-zone database to retrieve information on prohibited vehicle roadways, such as for zones with weight limitations, e.g., prohibit vehicles to exceed 1 ton.

Inventory constraints can be static or dynamic in nature. In one scenario, the route optimization engine may need to dynamically compute the time based on rates at which drivers of a vehicle or autonomous vehicles can load or unload certain types of inventory. Rather than specifying an exact amount of time to the optimization server per inputted destination on the route, an administrator or automated computer system may specify the amount of time it takes to load, unload, or process per inventory unit and inventory type. The optimization engine can keep instructing or giving information to a driver or vehicle to make delivery re-attempts up to a maximum number of times as specified by the system configuration, so that other drivers or vehicles which are farther away do not have to travel to this vehicle's immediate vicinity. If the receiving autonomous vehicle or customer is unable to accept the item being delivered, dropped off, or picked up after the number of retry attempts have been exhausted, then the system may assign and dynamically re-route the driver or autonomous vehicle to a queuing area or storage facility to unload the undelivered items.

For example, an inputted destination can have attributes that specify that it takes five minutes to unload per 20 liters of beer, and may require the specified amount of beer that must be unloaded for a particular destination. The optimization server may then dynamically compute the amount of time it will take to unload 20 liters of beer, and add this value to any existing time on-site for the destination being visited. In another instance, where inventory is being expended, depleted, or unloaded, the optimization server may dynamically compute when a vehicle will exhaust its fuel supply, or amount of salt remaining on a spreader, or amount of charge left on an electric vehicle, and etc. By determining when the inventory will reach a level of depletion specified by an administrator, the optimization server can set a maximum time or distance for a route, or suggest an inventory replenishment location, such as another vehicle whose position can be determined through dynamic positioning or a fixed collection of communicatively interconnected facilities whose inventory data is available in real-time.

Additionally, inventory constraints may be applied to inventory package dimensions, such as, e.g., height, length, width, volume, and weight. For example, the system and the method may filter or restrict deliveries or pickups to a specific drop box or storage locker when the package size of the inventory exceeds the allowed dimensions of the drop box or storage locker. In this case, the delivery or pickup vehicle would not be routed to deliver or pick up a package to an incompatible delivery receptacle, such as, e.g., a big screen T.V. into a mailbox or pick up an item too large for the type of vehicle visiting the location.

In some embodiments of the present invention, an inventory does not have to be an object of exchange between the delivery vehicle and a customer or a replenishment vehicle, but may be a person being transported from one location to another, such as a taxi service or a ride-sharing service. For vehicles delivering object inventories, the driver of the vehicle may also be considered an inventory item. For example, after the delivery driver completes their route to deliver inventory to one or more customer locations, the driver may be routed to the most optimal final destination, e.g., a storage facility.

Previous inventions may require specific, fixed geospatial coordinates and/or a physical street address as an inputted destination for the optimization module. However, in the present invention, inputted destinations can be references to objects, vehicles, drivers, smartphones, and other internet-of-things (IoT) sensors whose positions are dynamic and may change at any time and at any rate. Detected, received, or requested changes in the dynamic position of an inputted destination, e.g., a customer, may occur at any frequency, and may alter the optimized route sequence for one or multiple vehicles in a fleet. The system may continually re-sequence routes for the entire fleet, or a specific sub-route that has already been optimally sequenced or generated so that a vehicle or driver can reach or follow the moving target destination using dynamic positioning.

For example, if an autonomous vehicle needs to make a delivery to an inputted destination, the actual destination might be the last known or last detected GPS coordinates of the recipient. The customer's delivery location may not necessarily be their home, but can be the current location of their cellphone. The system may continually re-sequence the route at a predetermined time interval to continually track the dynamic position of the cellphone, and then re-route the most efficiently located delivery vehicle to the recipient's location. The optimization module may also take inventory data into consideration, such that it routes the delivery vehicle with the appropriate inventory to the recipient's location. In another example, if 10 people in a city ordered the exact same item, having the exact same SKU, and one of the recipients suddenly becomes unavailable, or cancels the order while a delivery vehicle is on its way, the system can provide an alternate routing plan to the same driver, another driver or autonomous vehicle to deliver the undelivered item to another eligible recipient of the same item in the area after meeting all eligible route, vehicle, and administratively defined constraints. Being able to use dynamic positions as an inputted destination to the route optimization module may enable additional advanced scenarios, such as to permit human or machine recipients to update the desired delivery location or pickup location.

The administrator can also specify accelerated or decelerated travel time coefficients for each vehicle or type of vehicle in the fleet so that the optimization server could consider these coefficients in the optimization and analysis process.

Business constraints may take into consideration real scenarios and limitations that exists in a business, such as, e.g., vehicles or drivers may have different characteristics and operator skills, there may be a need for certain drivers to visit certain destinations, customers may have different priorities or driver preferences, customers and businesses may have various time windows so that drivers do not make delivery attempts outside or inside of business hours such as to intentionally visit certain destinations outside of business hours for, e.g., security patrols, theft or loss prevention. In addition, the optimization server may optimize a route based on revenue constraints such that the route does not exceed a maximum amount of revenue, or cost constraints such that a route does not exceed a maximum cost. This may ensure that each vehicle of distributed routes does not get assigned more sales revenue per route or that each vehicle may only be insured against theft or other damages for up to a certain amount per occurrence, and a route is planned accordingly to stay within insured limits. For example, if cash exchange is involved during the traversal of a route, e.g., collecting cash-on-delivery, the administrator may set the route such that a driver never possesses more than a predetermined amount of money, e.g., $10,000 in revenue per route. In this case, drivers will not be routed to destinations, e.g., customers, where they can exceed total revenue amount in aggregate for the entire route. Business constraints may also incorporate historically collected information from first-party or third-party data sources, such as the amount of time a driver or vehicle may spend at a specific location, e.g., walking up flights of stairs, waiting for an elevator, waiting for a secretary to answer the door, and/or waiting for a loading dock operator to open the freight door.

Natural-world constraints may be parameters that align with natural occurrences, such as the times of sunrise and sunset. For example, a departure time may be set for "sunrise" on the following day, and set to end "before sunset", instead of, e.g., start at 7:34 AM and end at 5:14 PM. Semantic constraints such as these can be used when conditions are variable and based on the real world. Another example is setting a route to have a duration length approximately equal to the duration for a certain driver or vehicle type to complete the route. These allow the administrator to communicate with the system in natural languages, which may provide convenience when technical data are not available, such as the precise time of sunrise and/or sunset. The optimization server may retrieve natural-world information from the platform, e.g., the weather module and database, such as for the times of sunrise and/or sunset in the present example.

Natural-world constraints may also comprise geographic limitations. For example, a route sequence may be optimized based on geographic properties of the roads of the route, such as if a delivery vehicle is delivering fresh seafood, it may want to avoid direct sunlight and may be routed through low sunlight roads, such as, e.g., between valleys wherein hills and mountains provide shade, or between high buildings and skyscrapers. A route may also be sequenced to avoid sunlight for heat reduction of the vehicles, which in turn may reduce energy consumption due to the vehicles' operation at lower temperatures. This data may be accumulated first-hand by the vehicles of the fleet that may record environmental properties, such as, e.g., light exposure, wind speed, temperature, and humidity, or it may be acquired through a third-party source. An example of a third party source may be government data about a sign that reads, "Daylight Headlight Section", which may indicate dark driving areas, such as, e.g., a wooded area.

In some embodiments, the present invention allows for the customizing and combining of constraints in any and all combinations. Due to the nimble architecture of the system, the constraints may be iterated or modified to be applicable to any business or industry, and as rules, regulations, and needs change. This allows the system to be continually updated with the latest rules and constraints, which in turn may provide the most up-to-date dynamic routing possible.

Figure 3A:
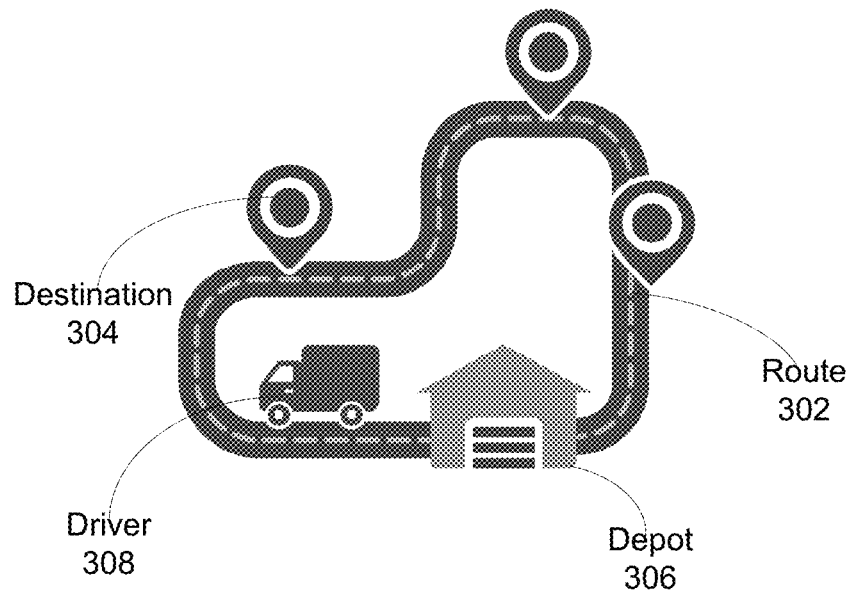
FIGS. 3A-B are schematic renditions of optimized routes comprising a single driver and a single depot, according to at least one embodiment.
Figure 3B:
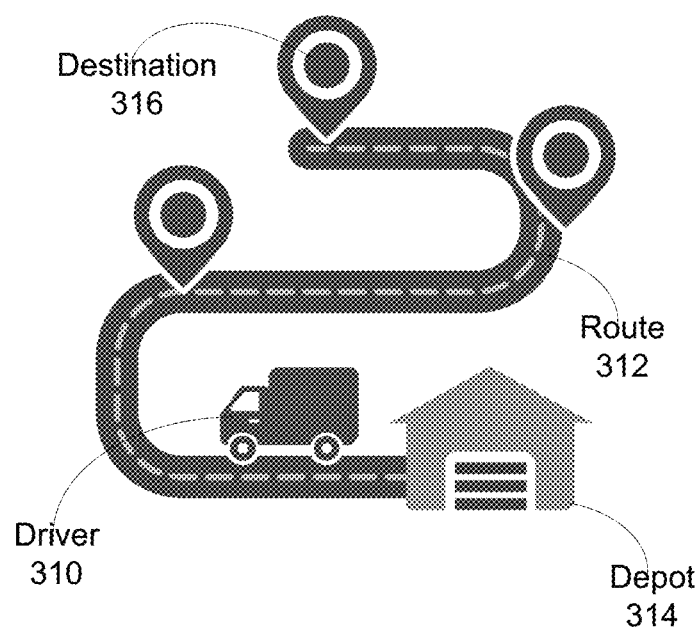

FIGS. 3A-B are schematic renditions of optimized routes comprising a single driver and a single depot, according to at least one embodiment. The routes may comprise one or more destinations and may be sequences based on operational efficiency. In FIG. 3A, route 302 may comprise a last destination 304 that is the same as its departure destination 304 such that it is a round-trip route. The last destination here is depot 306 from which driver 308 originates. In FIG. 3B, driver 310 begins route 312 at depot 314 and terminates at route 312's last destination 316. Route 312 may also have been optimized to end at an unspecified destination, taking into consideration efficiency, such as, e.g., the last destination is set at or near the first destination of the following day's route such that the driver does not needlessly traverse back to the depot.

Figure 4A:
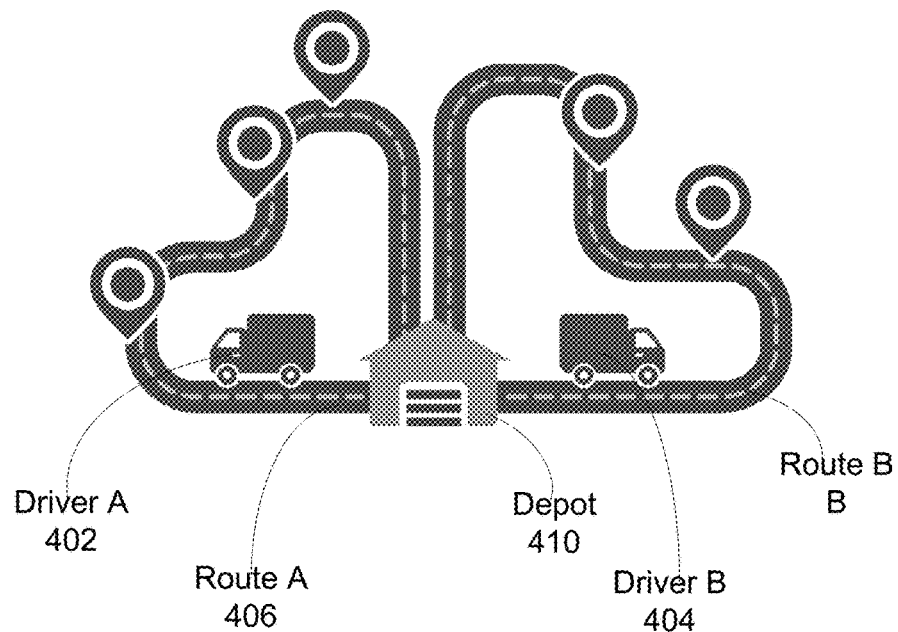
FIGS. 4A-B illustrate optimized routes comprising multiple drivers and a single depot, according to at least one embodiment.
Figure 4B:
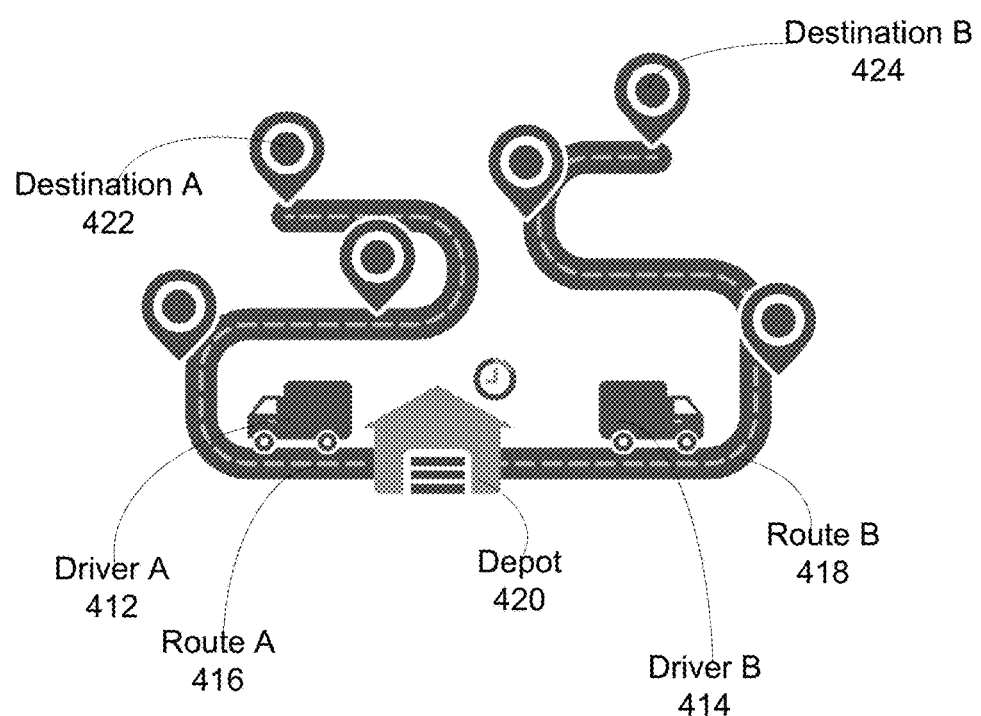

FIGS. 4A-B illustrate optimized routes comprising multiple drivers and a single depot, according to at least one embodiment. The routes may comprise one or more destinations, and may each be assigned to a driver. In FIG. 4A, driver A 402 and driver B 404 are responsible for route A 406 and route B 408, respectively. Both routes comprise a departure destination that is the same as their final destination, depot 410, such that it is a round-trip route. In FIG. 4B, driver A 412 and driver B 414 are responsible for route A 416 and route B 418, respectively. Both routes begin at depot 420 and are terminated at last destination A 422 and last destination B 424, respectively. The route may also be optimized to end at unspecified destinations, taking into consideration efficiency, such as, e.g., the last destinations are set at or near the first destinations of the following day's routes such that the drivers do not needlessly traverse back to the depot.

FIGS. 5A-B are schematics of optimized routes comprising multiple drivers and multiple depots, according to at least one embodiment. The routes may comprise one or more destinations, and may each be assigned to a driver. In FIG. 5A, driver A 502 and driver B 504 are responsible for route A 506 and route B 508, respectively. Both routes comprise a departure destination that is the same as their final destination, depot A 510 and depot B 512, respectively, such that it is a round-trip route. In FIG. 5B, driver A 514 and driver B 516 are responsible for route A 518 and route B 520, respectively. Route A 518 begins at depot A 522 and terminates at last destination A 524, while route B 520 begins at depot B 526 and terminates at last destination B 528. The route may also be optimized to end at unspecified destinations, taking into consideration efficiency, such as, e.g., the last destinations are set at or near the first destinations of the following day's routes such that the drivers do not needlessly traverse back to the depots.

In at least one embodiment, the present invention discloses a system and a method of dynamic customization and sequencing of multi-driver, multi-depot, no-depot, and multi-destination routes. The system may allow for modifications of routes that may already be in progress, e.g., adding and removing destinations, without violating constraints such as time windows and travel duration. The position of a driver within a route represents the driver's order in the broader routing plan. For example, if a driver cancels or does not take an assigned route, then the queue may dynamically update to designate the route to the next driver in line.

After modification, the existing route may be re-sequenced such that remaining destinations remain optimally sequenced while taking the modifications into account. For example, if a new destination is inserted into an existing route comprising multiple destinations, then the new destination will be positioned at the most optimal route position and may be assigned to the most appropriate driver or vehicle based on availability, shortest time, closest distance, and/or cost efficient, e.g., a vehicle with an existing route in or near the area of the new destination. After the modification, the route may be re-sequenced such that the destinations are out of original order, if required for the route to remain optimal, while staying within specified constraints.

Figure 6A:
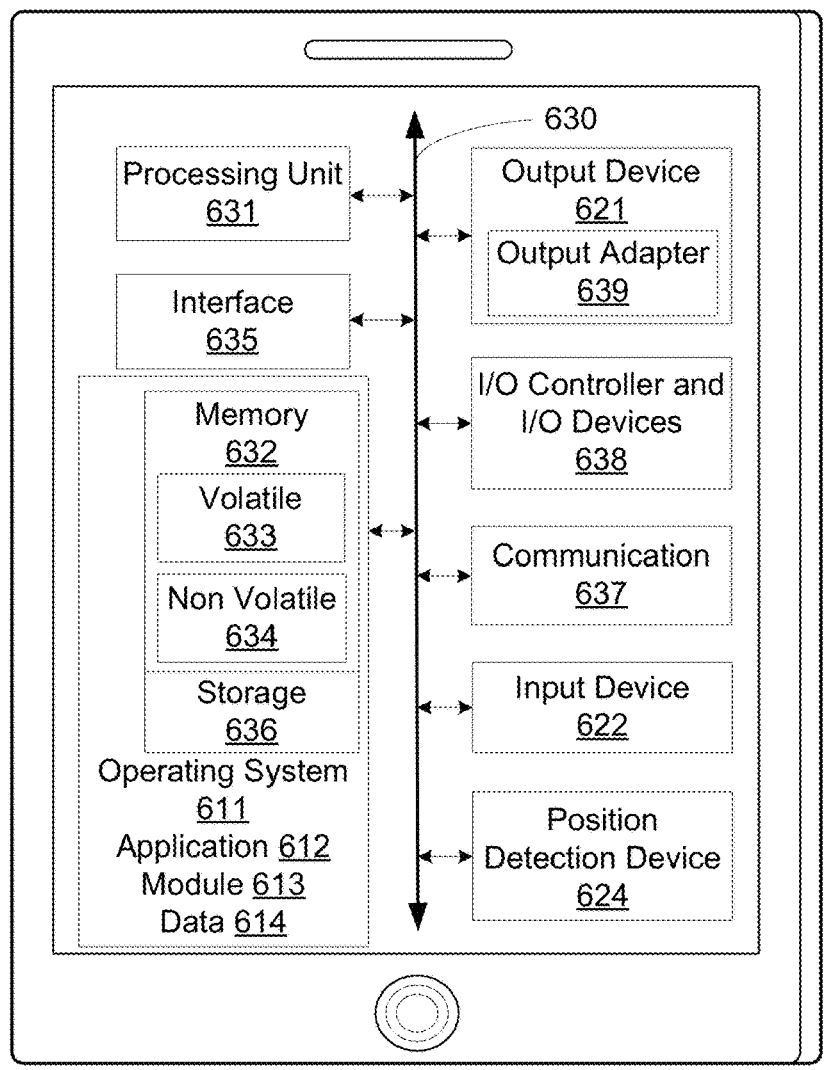
FIG. 6A illustrates a computing environment of the mobile device for implementing various aspects of the invention.

FIG. 6A illustrates a computing environment of a mobile device for implementing various aspects of the invention. The processing unit 631 may be any of various available processors, such as single microprocessor, dual microprocessors or other multiprocessor architectures. The system bus 630 may be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCST).

The system memory 632 may include volatile memory 633 and nonvolatile memory 634. Nonvolatile memory 634 may include read only memory (ROM), programmable ROM (PROM), electrically programmable ROM (EPROM), electrically erasable ROM (EEPROM), or flash memory. Volatile memory 633, may include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

The mobile device also includes storage media 636, such as removable/non-removable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface 635 may be used to facilitate connection.

The mobile device may further include software to operate in the computing environment, such as an operating system 611, system applications 612, program modules 613 and program data 614, which are stored either in system memory 632 or on disk storage 636. Various operating systems or combinations of operating systems may be used.

Input device 622 may be used to enter commands or data, and may include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 638. Interface ports 638 may include a serial port, a parallel port, a game port, a universal serial bus (USB), and a 1394 bus. The interface ports 638 may also accommodate output devices 621. For example, a USB port may be used to provide input to the mobile device and to output information from the mobile device to an output device 621. Output adapter 639, such as video or sound cards, is provided to connect to some output devices such as monitors, speakers, and printers.

The position detection device 624 may be a device that communicates with a plurality of positioning satellites, e.g., GPS satellites, to determine the geographical location of the mobile device, and thus the user. To determine the location of the user, the position detection device 624 searches for and collects GPS information or signals from four or more GPS satellites that are in view of the position detection device 624. Using the determined time interval between the broadcast time and reception time of each signal, the position detection device 624 may calculate the distance of the user relative to each of the four or more GPS satellites. These distance measurements, along with the position and time information received in the signals, allow the position detection device 624 to calculate the geographical location of the user.

The mobile device may be communicatively coupled to remote computers, such as, e.g., the platform, through the network. The remote computers may comprise a memory storage device, and may be a personal computer, a server, a router, a network PC, a workstation, a microprocessor based appliance, a peer device or other common network node and the like, and typically includes many or all of the elements described relative to computer 601. Remote computers may be connected to computer 601 through a network interface and communication connection 637, with wire or wireless connections. A network interface may be communication networks such as local-area networks (LAN), wide area networks (WAN) or wireless connection networks, or by cellular network communication technology. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

Figure 6B:
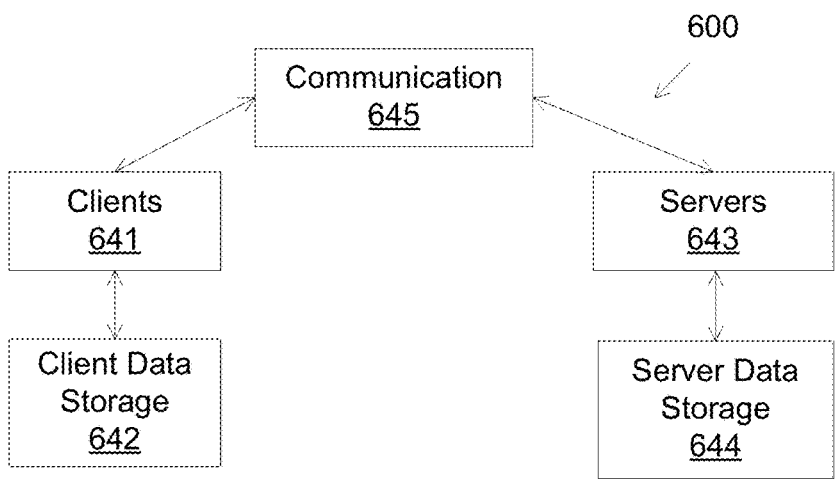
FIG. 6B is a schematic block diagram of a sample computing environment with which the present invention may interact.

FIG. 6B is a schematic block diagram of a sample computing environment 600 with which the present invention may interact. The system 640 includes a plurality of client systems 641. The platform of the present system may be a program implemented by a client system 641. The system also includes a plurality of servers 643. The servers 643 may be used to employ the present invention. The system includes a communication network 645 to facilitate communications between the clients 641 and the servers 643. Client data storage 642, connected to client system 641, may store information locally. Similarly, the server 643 may include server data storages 644.

In at least one embodiment, the present invention discloses a system and a method for geocoding coordinates of drivers, vehicles and destinations on a map. Geocoding may be a process of using the description of a location, e.g., a destination address, to reveal the latitude and longitude coordinates of that location. Users of the system may be tracked through the geocoding of their location. Tracking may be defined as the action of persistent storing or using signals that are transmitted to GPS devices or received by a device from location emitting sensors, e.g., cellular towers, NFC near field communication devices, BLE Bluetooth low energy device, and iBeacon technology in order to determine the location, speed and direction of a driver and/or a vehicle in real time. The system may also allow for reverse geocoding, which may be a process of back (reverse) coding of coordinates to a readable destination description, e.g., the destination address or rooftop coordinates.

A transmission system in the mobile device may communicate with the platform and optimization server through a network, such as, e.g., a cellular communication network. The platform may be a software-based program implemented in a processor of a remote computing device that is also coupled with the network. For example, each user may transmit information about its current position through a position detection device coupled with an antenna, such as, e.g., a GPS system. The mobile device may comprise other internal and/or external sensors, such as, e.g., a motion sensor, a microphone, a camera, a biometric sensor, an accelerometer, a gyroscope, and/or a magnetometer, and may identify drivers and/or user behaviors based on sensory data. In addition to user or driver behaviors, the sensory data may allow the system to reveal customer behaviors, such as, e.g., a customer who is chronically not home, that may be factored into the route optimization. A transmission may also include other information linked to the vehicle's current position, such as, e.g., a comparison of the change in coordinates with respect to time, which may be used by the platform to develop information about how a user is maneuvering through traffic and to determine existing traffic conditions, such as, e.g., traffic speed.

The communication link between the mobile device and the platform may not be required to be maintained continuously open, such that the link may be disconnected after the position detection device transmits location data to the platform. The data from the user may be added to a traffic database, and combining with other first-party tracked data from other users and/or from third-party traffic data sources, such as a traffic data vendor, the prediction module may develop information about current traffic conditions. Using that information, a preferred route is sequenced which may be transmitted from the optimization server to the vehicle. In addition to first-party and third-party GPS data, the system of the present invention may allow the administrator or user to override first-party and third-party data for any reason to create new datasets with their own overriding attributes about the various road segments. For example, an experienced dispatcher may choose to disregard a road-closure warning, because the dispatcher traveled that route earlier in the day and knows that the road construction has been completed. As a result, the dispatcher, or any other authorized administrator of the system can update the mapping module to temporarily or permanently ignore road-closure alerts for that road segment.

In some embodiments, the mapping module of the optimization server may overlay a map of a route, which may then be used as a framework for the predictive module to determine future user behaviors and movements, e.g., footstep patterns, in addition to vehicle maneuvers to produce the most optimized driving and walking route. In order for the system to differentiate user behavior from user vehicle maneuvers, the prediction module may equate a sustained slow speed of travel reported from the position detection device as the user is on foot, such as, e.g., 1-4 MPH. The prediction module may make use of transmission counts and average times to determine whether the user is traveling by vehicle or on foot, and to build on top of the map a history of vehicle maneuvers and user footsteps. For example, the system may log each transmission burst emanating from the position detection device along with coordinates and time to obtain historical data of traversal by the user in order to predict future traversal patterns by taking averages of the data points. Additionally, the system may detect a transition between walking and driving modes using an accelerator, an internal, an external and/or an embedded sensor of the mobile device.

Generally, a large amount of user traversal data points from multiple users may provide for more accurate predictions, though a small sampling size may be sufficient. As more and more data are recorded, the map may be continually refined by the development of traversal patterns. The traversal patterns may be extrapolated and utilized by the prediction module for forecasting future traversal behaviors. Generally, the prediction module may acquire historical data on traversal patterns that closely matches the present situation, such as, e.g., time of day and weather condition.

For example, when a roadway segment is first traveled by a user by foot, the server may not distinguish whether the user has traveled off of the original path of the roadway, for example, if the user parks their vehicle to walk across a pavement off of the charted roadways on the map. However, with repetition and an accumulation of data points, the system may learn and identify that the user is walking on a walking path that the map may not have originally identify. In this situation, the system may revise the map to insert such a walkway. Thus, in essence, walkways that are used for user behaviors, e.g., walking, may not be reflected on a map until enough data points are collected from tracked users traversing that path. Future route optimizations may be improved by factoring in tracked user behavior patterns.

Figure 7A:
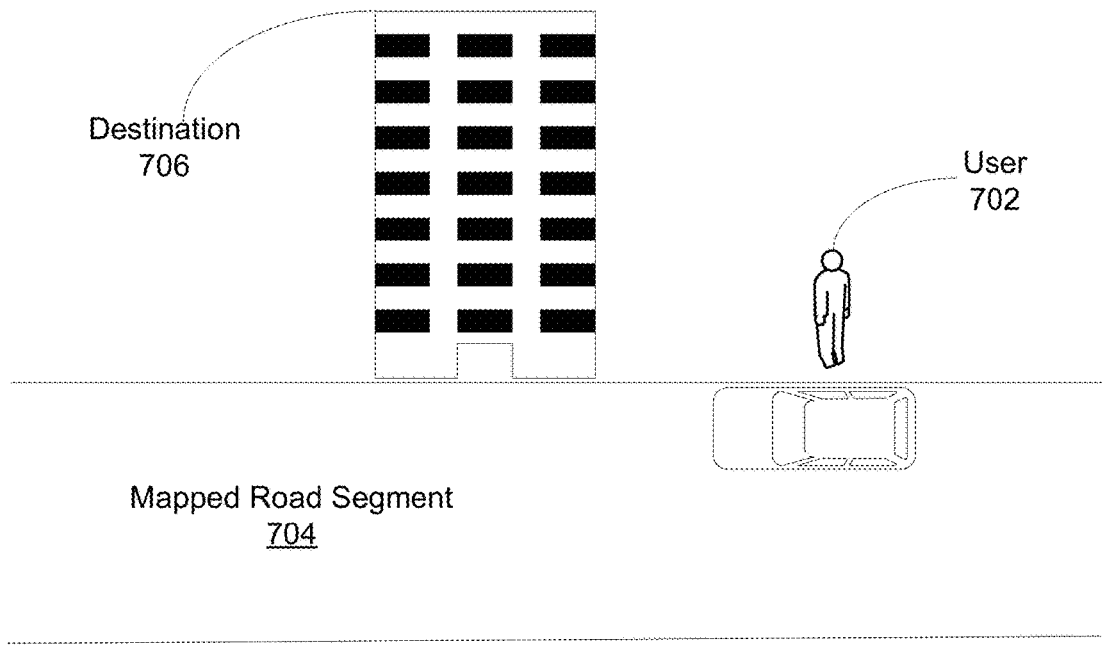
FIGS. 7A-B are schematic diagrams showing machine learning of a user walkway by the system, according to at least one embodiment.
Figure 7B:
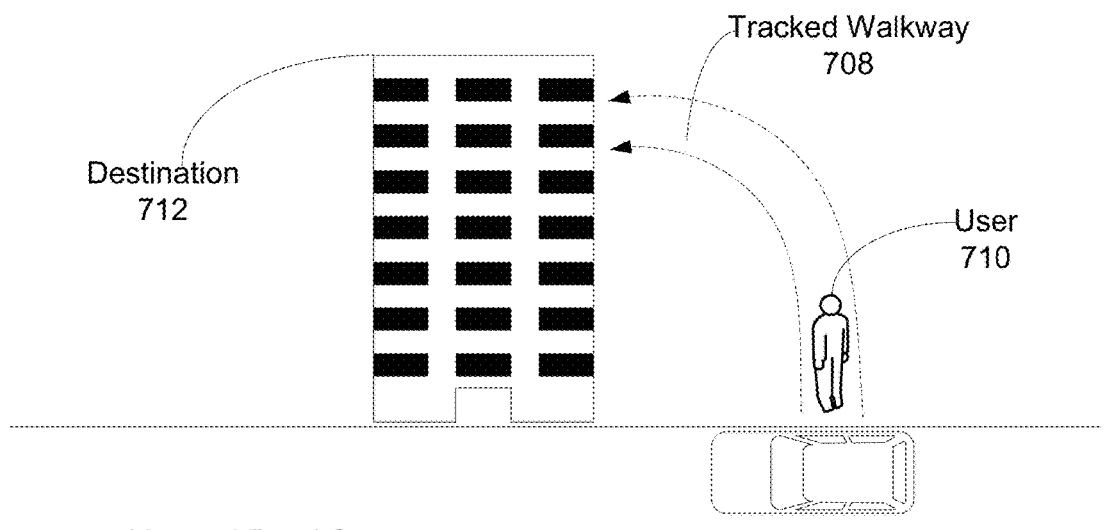

FIGS. 7A-B are schematic diagrams showing machine learning of a user walkway by the system, according to at least one embodiment. User 702 may be in possession of a mobile device, such as, e.g., a smartphone, PDA, tablet, smart watch, and any other personal mobile device. A mapping module may provide a vector map overlaid with the coordinates of users and destinations. A previously mapped road segment 704 may be provided for user 702 to traverse. As user 702 approaches destination 706 for the first time, as seen in FIG. 7A, the mapping module may not have data that there is a walkway present for user 702 to traverse by foot, e.g., walking. In FIG. 7B, a tracked walkway 708 may be learned by the system with subsequent traversals by one or more user 710. Data sample size may be directly proportional to quality of the prediction and identification of tracked walkway 708. Other information may be linked to tracked walkway 708, such as, e.g., walking speed, location of initial moment of foot traversal, and location of delivery entrance at the destination 712. A previously mapped road segment 714 may be provided for user 710 to traverse.

If traversal of a given road segment and/or walkway takes significantly longer or shorter than predicted, the mobile device may alert the platform. The server may subtract outliers of old trip plans that are not indicative of normal traversals. The consideration of variance allows the system to accommodate normal variances due to traffic lights, buses, pedestrians, and other factors. As a vehicle progresses through its route, a data log of traversal transmissions may be provided to the platform. Transmissions may occur in real-time or may be reconciled or synchronized to the system in batches, e.g., such as when a vehicle's or device's Internet connectivity is temporarily lost. A log from a large number of users may be merged to create historical records organized by geography, time, and etc. Combining current information with historical information, the prediction module may forecast future traffic patterns and user behavior patterns. Therefore, users may be provided with not only the most efficient, e.g., shortest, driving route given current traffic conditions, but an optimal route sequence that is predicted for the entirety of the trip that accounts for user behaviors.

In some embodiments, user behavior tracking is applied to all types of user behaviors. For example, the system may track that a particular user tends to take constant breaks after every visit to a destination. Through the same method of GPS tracking described above, the system may over time incorporate such learned behavior from the user into its route prediction for future routes. The system may make future user behavior predictions by analyzing historical tracked user behaviors. For example, if a user tends to be late to their first destination when there is heavy rain on the road, then the system will predict future downpour will yield similar results. The system may also be dynamic such that if it receives data that a user is late departing from a destination, or that the user is out of sequence visiting the destinations, it will predict data to re-optimize the route taking into consideration the changes.

In at least one embodiment, the present invention discloses a system and a method for creating and managing one or more territories on a map for efficient routing. A territory may be an administrator-defined virtual area that can group together multiple profiles. A territory may take the shape of a circle, semi-circle, or polygon. The territories may be also be defined by ZIP code, county line, or state line, and may be manually adjusted by an administrator. The system may summarize territory analytics, such as, e.g., the number of customers, addresses, or geospatial records that are within the territory. Routes sequenced by address data of a territory may be assigned to a user based on visual determination of the proximity to storage locations, e.g., a storage depot. The administrator may also balance routes within a territory, e.g., each user is assigned an equal amount of destinations and/or travel distance. Avoidance zones may be used in conjunction with the territory optimization system, such that users are not routed to restriction areas within their own territory. A territory can also be detected automatically by the system based on historical data collected over time. When data collected over time resembles a territory, the system may suggest the creation of a dynamically detected territory, and the administrator can approve it.

In some embodiments, the optimization server may optimize a route for addresses within a defined territory based on revenue constraints, such that the route does not exceed a maximum amount of revenue. This may ensure balance among the users such that each user is not assigned more sales revenue per route; or that if each vehicle is only insured against theft or other damages for up to a certain amount per occurrence, a route is planned accordingly to stay within insured limits. For example, if cash exchange is involved during the traversal of a route, e.g., collecting cash-on-delivery, the administrator may set the route such that a driver in the territory never possesses more than a limited amount of money, e.g., $10,000 in revenue per route. In this case, drivers will not be routed to destinations, e.g., customers, where they can exceed total revenue amount in aggregate for the entire route.

Figure 8:
FIG. 8 shows multiple territories defined on a map, according to at least one embodiment.

FIG. 8 shows multiple territories defined on a map. Territory 802 may be defined by ZIP code, county line, state line, or it may be arbitrarily drawn by an administrator. Address 804 may be located within each territory from which a route may be sequenced and distributed to one or more users, such as, e.g., delivery personnel delivering packages. Territories may overlap, in which case overlapped addresses may be included in each territory that is in overlap. There may be an unlimited number of defined territories comprising any shape and any amount of overlap.

Figure 9A:
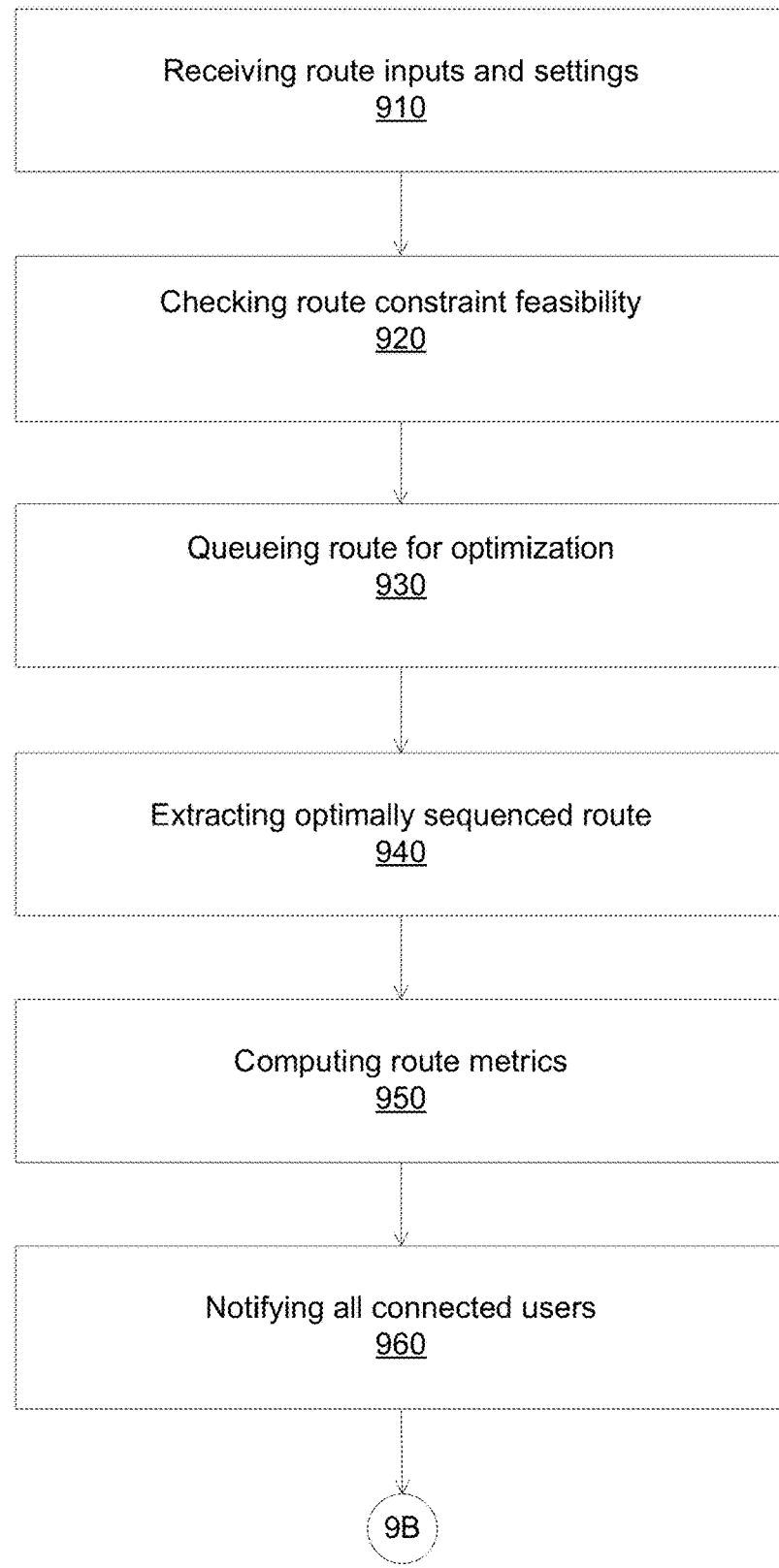
FIGS. 9A-B are flowcharts depicting a method of the present invention, according to at least one embodiment.
Figure 9B:
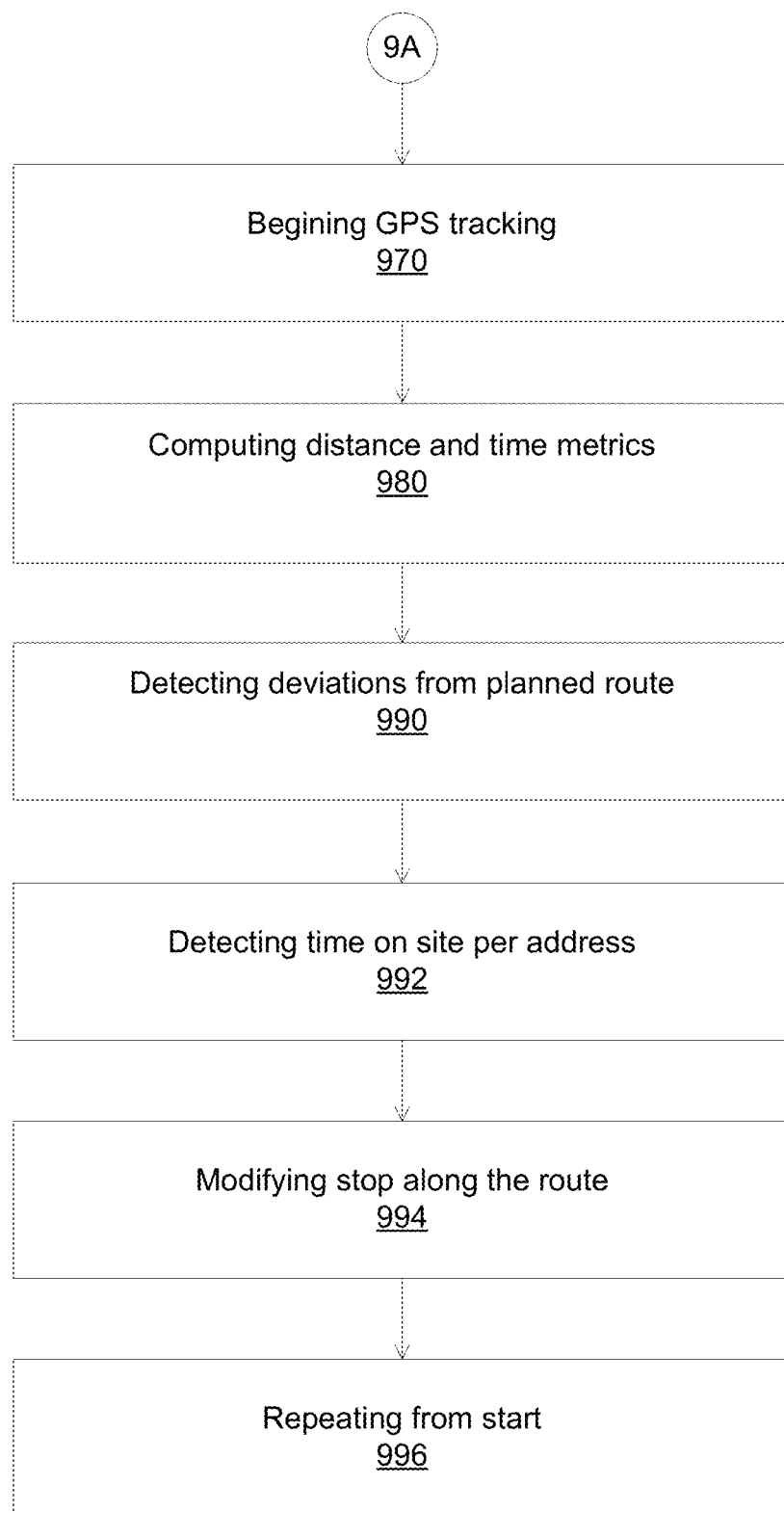

FIGS. 9A-B are flowcharts depicting a method of the present invention, according to at least one embodiment. In FIG. 9A, the system may receive administrator inputs and settings at operation 910. Operation 920 may check for the feasibility of the inputted constraints, then queues the route for optimization in operation 930. Operation 940 extracts an optimally sequenced route. Route metrics are computed at operation 950. All connected users of a system may be notified in operation 960. In FIG. 9B, GPS tracking may begin at operation 970. The system may compute distance and time metrics in operation 980 and detects deviations from the planned route, if any, in operation 990. Operation 1000 detects time on site per destination. In operation 1010, if a modification of the route is requested, such as by adding or deleting a destination, the method may repeat from the beginning in operation 1020. Contrary to existing systems, which may not change a generated route and merely estimate the impact that various constraints will have on arrival and departure times, the system of the present invention completely (and continually) re-sequences the entire route based on a variety of dynamic data for the expected time and at the expected area that the vehicle will traverse through.

Figure 10:
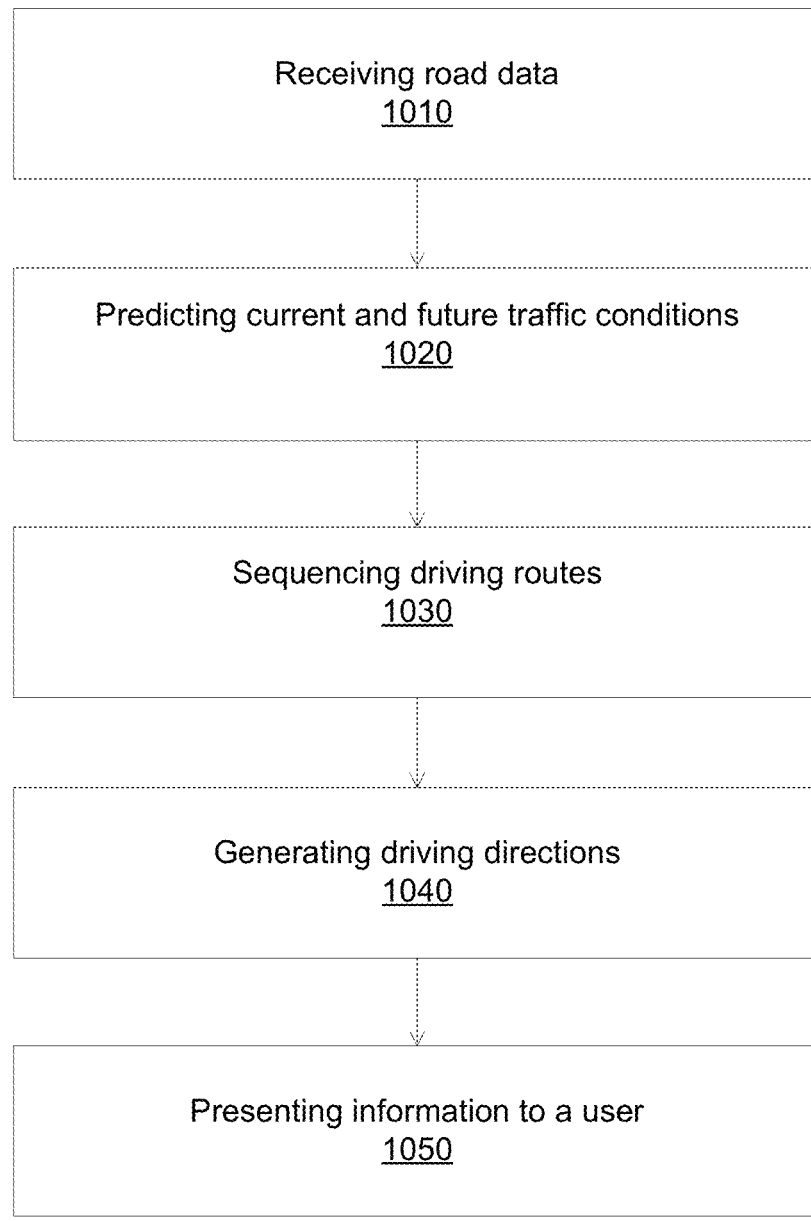
FIG. 10 is a flowchart depicting an alternative method of the present invention, according to at least one embodiment.

FIG. 10 is a flowchart depicting an alternative method of the present invention, according to at least one embodiment. Operation 1010 receives road data comprising traffic data, weather data, hazard data and avoidance zone data. The data may be real-time data, a historical data, and/or a predictive data. Operation 1020 predicts a current traffic condition and a future traffic condition based on the traffic data, weather data, hazard data, and avoidance zone data. Operation 1030 sequences one or more driving routes comprising a plurality of user vehicles and a plurality of destinations based on shortest travel time, shortest distance, shortest distance based on the current traffic condition and the future traffic condition, or an objective cost function. Operation 1040 generates one or more driving directions based on the sequenced driving routes. In some embodiments, operation 1010 to operation 1040 may be repeated at a predetermined time interval, or as real-time data change, or as one or more constraints are modified, or based on one or more configured triggers. Operation 1050 presents one or more data and/or metadata about the driving routes to the user vehicles.

Figure 11:
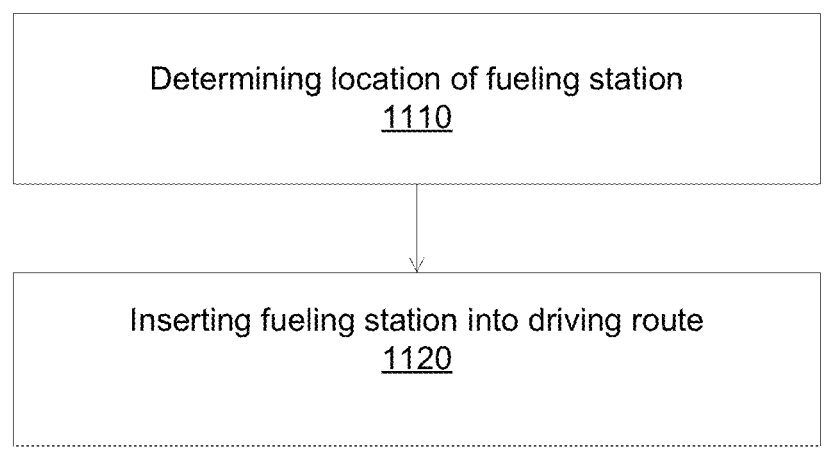
FIG. 11 is a flowchart of a fueling method, according to at least one embodiment.

FIG. 11 is a flowchart of a fueling method, according to at least one embodiment.

Operation 1110 determines a location of a fueling station based on vehicle type, travel distance, travel time, travel cost, fueling time, fuel cost, and/or current fuel capacity, and may also be based on a machine learning process. Operation 1120 inserts the fueling station closest to the next destination of the driving route into the driving route, and may be followed by the steps of receiving data, predicting current and future traffic conditions, sequencing driving routes, and generating driving directions.

Figure 12:
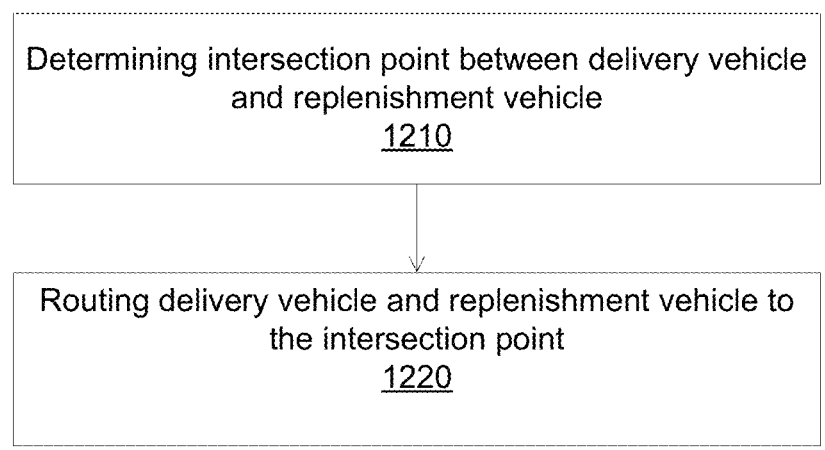
FIG. 12 is a flowchart of an inventory replenishment method, according to at least one embodiment.

FIG. 12 is a flowchart of an inventory replenishment method, according to at least one embodiment. Operation

1210 determines an intersection point between a delivery vehicle and an inventory replenishment vehicle. The inventory replenishment vehicle may comprise one or more inventory for the user vehicle, such as, e.g. a retail item or a person inventory. Operation 1220 routes the delivery vehicle and the replenishment vehicle to the intersection point at a predetermined time.

Figure 13:
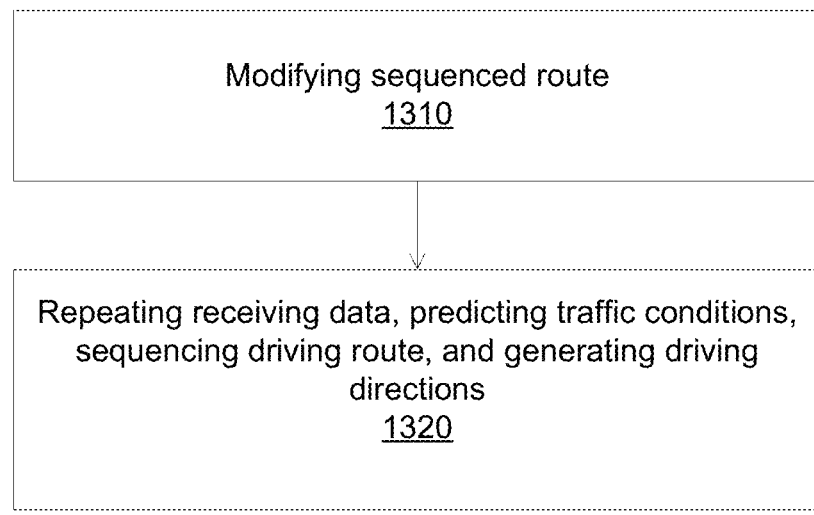
FIG. 13 is a flowchart of method to modify a route, according to at least one embodiment.

FIG. 13 is a flowchart of method to modify a route, according to at least one embodiment. Operation 1310 modifies a sequenced driving route while the route is in progress, such as, e.g., adding a destination or removing a destination. Operation 1320 repeats the steps of receiving data, predicting traffic conditions, sequencing driving route, and generating driving directions.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A machine-implemented method, comprising:
receiving for a segment of a road at least one of a traffic data, a weather data, a hazard data and an avoidance zone data,
wherein the at least one of a traffic data, a weather data, a hazard data, and an avoidance zone data comprise at least one of a real-time data, a historical data, and a predictive data,
wherein the historical data matches with a current circumstance;
determining a current traffic condition and a future traffic condition based on the at least one of a traffic data, a weather data, a hazard data, and an avoidance zone data;
sequencing one or more driving routes comprising a plurality of user vehicles and a plurality of destinations based on one of a shortest travel time, a shortest distance, a shortest distance based on the current traffic condition and the future traffic condition, and an objective cost function,
wherein the driving route obeys one or more predetermined constraints; and
generating one or more driving directions based on the sequenced one or more driving routes.

2. The method of claim 1, further comprising:
wherein the avoidance zone data comprises an avoidance zone, a traffic signal schedule, and a bridge schedule.

3. The method of claim 1, further comprising:
wherein the avoidance zone data comprises a driver restriction constraint, a vehicle-type restriction constraint and a prohibited maneuver constraint.

4. The method of claim 3, further comprising:
wherein the prohibited maneuver constraint comprises a left-turn restriction, a right-turn restriction, and a U-turn restriction.

5. The method of claim 3, further comprising:
wherein the prohibited maneuver constraint is determined by a country detection process.

6. The method of claim 1, further comprising:
wherein the one or more predetermined constraints comprise at least one of an operational constraint, an asset management constraint, an inventory constraint, a business constraint, a regulatory constraint, and a natural world constraint.

7. The method of claim 6, further comprising:
wherein the asset management constraint comprises a pre-approved road constraint and a vehicle capacity constraint.

8. The method of claim 6, further comprising:
wherein the inventory constraint comprises one or more persons.

9. The method of claim 8, further comprising:
wherein at least one destination is dynamically tracked through a mobile device for delivery of an inventory in an immediate vicinity of the destination.

10. The method of claim 9, further comprising:
wherein the plurality of destinations is not at fixed geospatial coordinate or physical location.

11. The method of claim 9, further comprising:
wherein the geospatial position of the plurality of destinations is dynamic.

12. The method of claim 8, further comprising:
wherein a position of the plurality of destinations is dynamically tracked through at least one position detection device, and
wherein the dynamic tracking of the position of the plurality of destinations is followed by repeating the steps of receiving data, predicting the current traffic condition and the future traffic condition, sequencing the driving route and generating the driving direction.

13. The method of claim 6, further comprising:
wherein the business constraint comprises a tracked user behavioral constraint, a customer behavior, a vehicle maneuver constraint, and an external machine constraint.

14. The method of claim 6, further comprising:
wherein the at least one of an operational constraint, an asset management constraint, an inventory constraint, a business constraint, a regulatory constraint, and a natural world constraint are set at predetermined priority levels when two or more constraints are obeyed.

15. The method of claim 6, further comprising:
wherein the inventory constraint comprises an inventory amount constraint, a package size constraint, and an inventory processing time constraint, and
wherein the inventory constraint is dynamic.

16. The method of claim 1, further comprising:
wherein the driving route is based on a future time that the driving route will be implemented.

17. The method of claim 1, further comprising:
determining an intersection point between the user vehicle and an inventory replenishment vehicle, and
wherein the inventory replenishment vehicle comprises one or more inventory for the user vehicle.

18. The method of claim 17, further comprising:
wherein the one or more inventory comprises a person inventory.

19. The method of claim 1, further comprising:
presenting one or more information to the user vehicle,
wherein the information is at least one of a data and a metadata about the driving route,
wherein the data and the metadata are based on a cost computation calculated between two destinations of the driving route, and
wherein the cost computation is based on the least one of a traffic data, a weather data, a hazard data and an avoidance zone data.

20. The method of claim 1, further comprising:
wherein the plurality of destinations comprises at least one of a customer location and a position detection device attached to an object.

* * * * *

UNITED STATES PATENT AND TRADEMARK OFFICE
CERTIFICATE OF CORRECTION

PATENT NO. : 10,354,217 B2
APPLICATION NO. : 15/658496
DATED : July 16, 2019
INVENTOR(S) : Dan Khasis It is certified that error appears in the above-identified patent and that said Letters Patent is hereby corrected as shown below:

On the Title Page

Item (54) and in the Specification Column 1 Lines 1-4 In the Title:
Change "Constraint-based complex dynamic route sequencing route sequencing for multi-vehicle fleets" to --Constraint-based complex dynamic route sequencing for multi-vehicle fleets--

Signed and Sealed this
Nineteenth Day of May, 2020

Andrei Iancu
*Director of the United States Patent and Trademark Office*